United States Patent
Wang et al.

(10) Patent No.: US 7,039,037 B2
(45) Date of Patent: May 2, 2006

(54) METHOD AND APPARATUS FOR PROVIDING SERVICE SELECTION, REDIRECTION AND MANAGING OF SUBSCRIBER ACCESS TO MULTIPLE WAP (WIRELESS APPLICATION PROTOCOL) GATEWAYS SIMULTANEOUSLY

(76) Inventors: Jiwei R. Wang, 315C Craig Henry Drive, Nepean, Ontario (CA) K2G 4G1; Alin Jayant, 1, Kumkum, Pedder Road, Bombay (IN) 400036; Vincent Kadar, 114 Scottwood Grove, Ottawa, Ontario (CA) K0A 1T0; Ken Kim, 27 Westmeath Cresent, Kanata, Ontario (CA) K2K 3B1

( * ) Notice: Subject to any disclaimer, the term of this patent is extended or adjusted under 35 U.S.C. 154(b) by 996 days.

(21) Appl. No.: 09/933,781

(22) Filed: Aug. 20, 2001

(65) Prior Publication Data

US 2003/0035409 A1   Feb. 20, 2003

(51) Int. Cl.
*H04J 3/24* (2006.01)
(52) U.S. Cl. ...................................... 370/349; 370/401
(58) Field of Classification Search ............... 370/349, 370/338, 328, 345, 342, 401, 466, 352; 709/249, 709/230, 227, 250; 455/463, 426.1
See application file for complete search history.

(56) References Cited

U.S. PATENT DOCUMENTS

| | | | | |
|---|---|---|---|---|
| 6,134,432 A | * | 10/2000 | Holmes et al. | 455/412 |
| 6,731,945 B1 | * | 5/2004 | Do et al. | 455/463 |
| 6,781,960 B1 | * | 8/2004 | Charas | 370/255 |

OTHER PUBLICATIONS

"Wireless Application Protocol (WAP) Specification"; version 1.2.1, Jun. 2000, WAP Forum; http://www.wapforum.com/what/technical.htm; pp. 1-5.
"WAP Wireless Session Protocol Specification", version May 4, 2000; Wireless Application Protocol Forum Ltd. 2000; pp. 63-70.
"WAP Wireless Transaction Protocol Specification", version Feb. 19, 2000, Wireless Application Protocol Forum 2000; pp. 22-66.
"WAP Wireless Datagram Protocol Specification"; version Feb. 19, 2000; Wireless Application Protocol Forum Ltd. 2000; pp. 23-50.

(Continued)

*Primary Examiner*—Chi Pham
*Assistant Examiner*—Alexander O. Boakye

(57) ABSTRACT

A method (FIG. 5) and apparatus (FIG. 3) to provide control and policy enforcement of WAP (Wireless Application Protocol) services in a wireless data networks is taught herein. WAP traffic is inspected with efficient algorithms to intercept un-registered WAP access and intercept dynamic change of user service selection. The intercepted WAP requests are modified with value-added parameters (such as QoS and subscriber identifiers) as per user and service provider agreement and table data. A series of strategies are described to blend wireless intelligence, user preference and service subscription, network operator requirements and service provider or enterprise preferences into routing and drive page generation. The means to dynamically provision users' service choices to wireless network elements are also presented without having to break the session within the system. This enables innovative data services such as pay-per-use, smart routing, and enterprise secured WAP services unlike any current conventional system.

20 Claims, 18 Drawing Sheets

WAP Controller (234) Block Diagram

OTHER PUBLICATIONS

"WAP Architecture Specification"; version Apr. 30, 1998; Wireless Application Protocol Forum, Ltd.; 1998.

"WAP Wireless Transport Layer Security Specification"; version Feb. 18, 2000; Wireless Application Forum, Ltd. 2000.

J. Postel; "User Datagram Protocol"; IETF RFC-768; Aug. 28, 1980; http://ftp.isi.edu/in-notes/rfc768.txt' pp. 1-3.

"Internet Protocol"; IETF RFC-791; Sep. 1981; http://ftp.isi.edu/in-notes/rfc791.txt; pp. 1-46.

R. Fielding, et al. "Hypertext Transfer Protocol-HTTP/1.1"; IETF RFC-2068; The Internet Society 1999.

Open Service Architecture, Application Programming Interface-Part 1 (Release 1999); 3GPP TS 29.198 v 3.2.0, 3$^{rd}$ Generation Partnership Project; Dec. 2000.

"WAP Architecture Specification"; version Oct. 17, 2000; Wireless Application Protocol Forum, Ltd., 2000-2001.

"WAP TLS Profile and Tunneling Specification", prototype Apr. 11, 2001; Wireless Application Protocol Forum, Ltd. 2001.

"Exalink Licenses Certicom's WTLS PLus & SSL Plus to Enable Secure WAP Gateway for M-Commerce Solutions"; http://www.certicom.com/about/pr/00/000509-1.html; pp. 1-3.

"Exalink to WAP-ify Comverse Backbone for $480 M"; http://www.ucalert.com/2000_issues/0700-04.html; pp. 3-4.

* cited by examiner

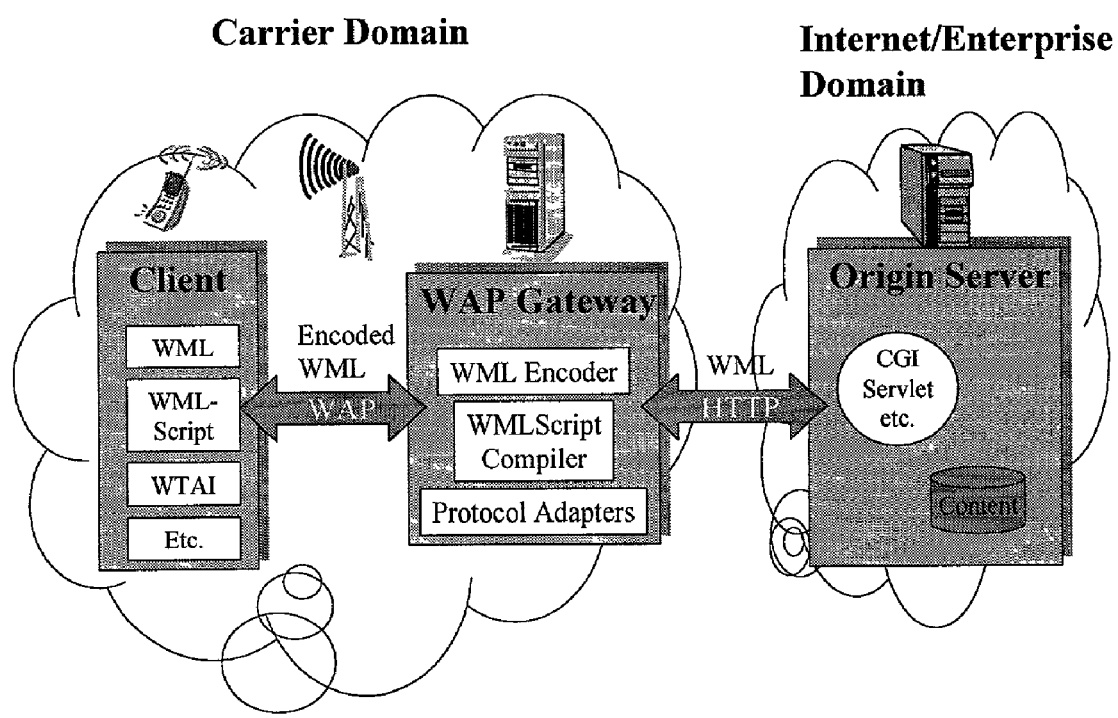
Figure 1A WAP Architecture (Prior art)

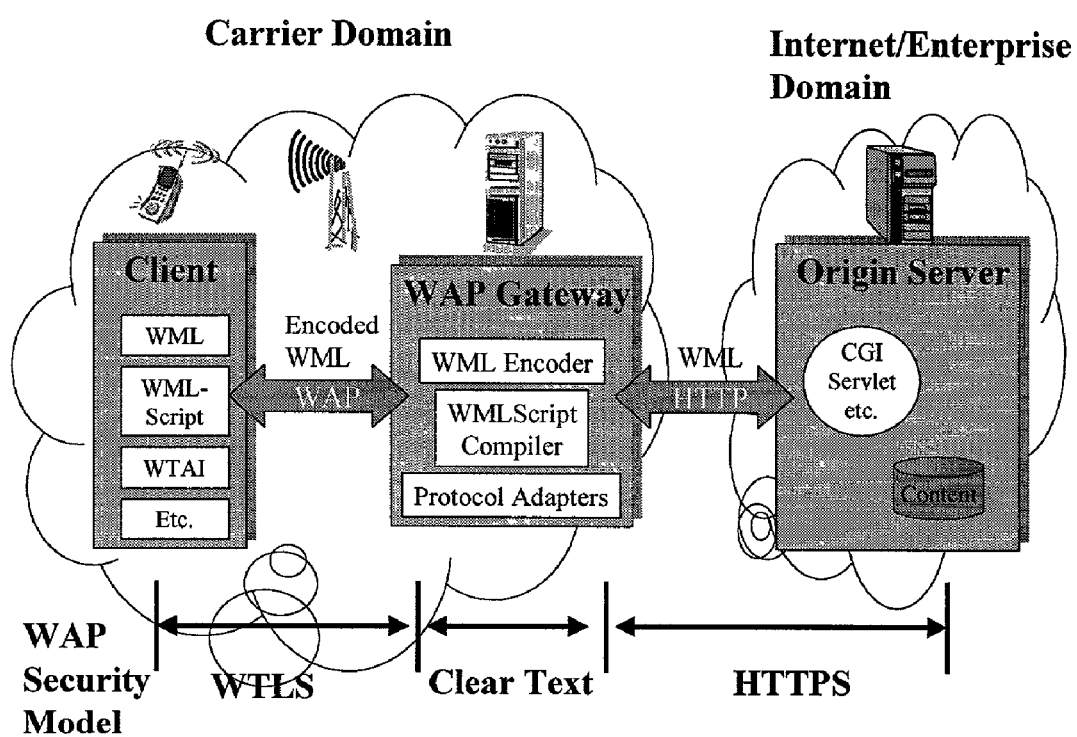
Figure 1B Security Hole in the Existing WAP Architecture (Prior Art)

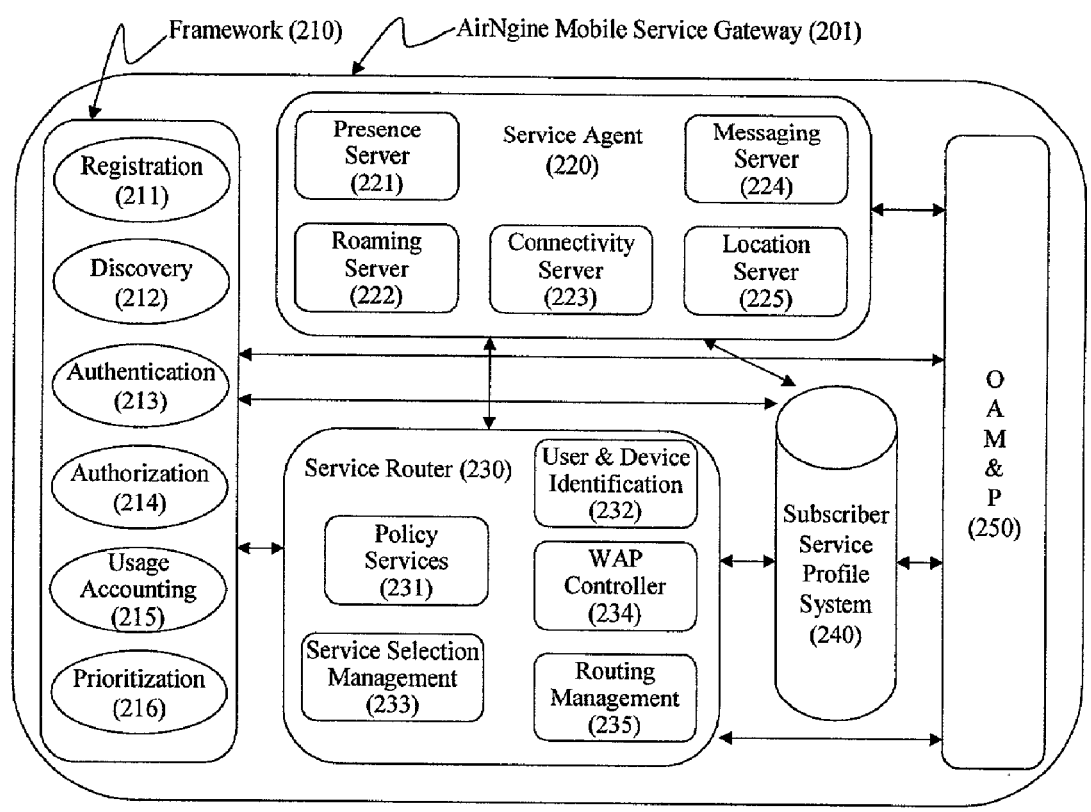
Figure 2 AirNgine Mobile Service Gateway (201) Block Diagram

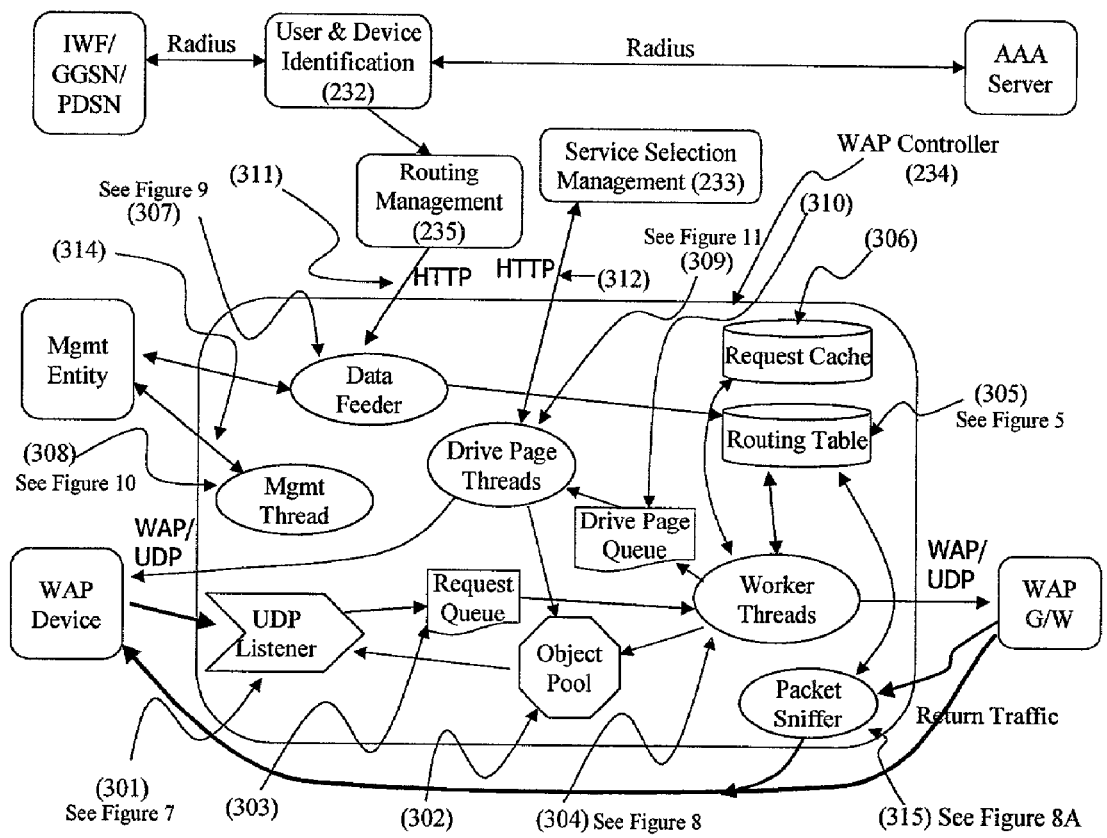
Figure 3 WAP Controller (234) Block Diagram

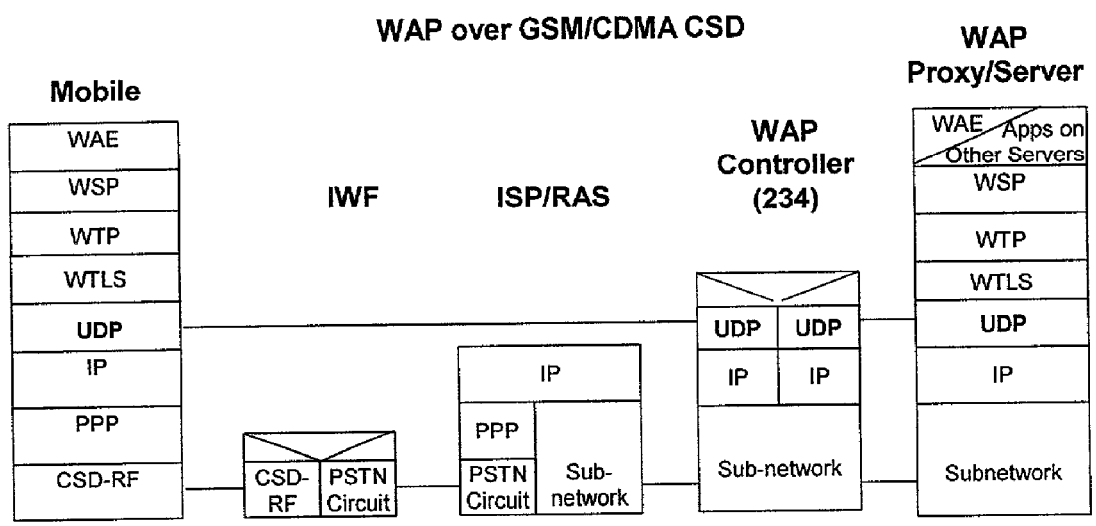
Figure 4 WAP Controller (234) Protocol Stack

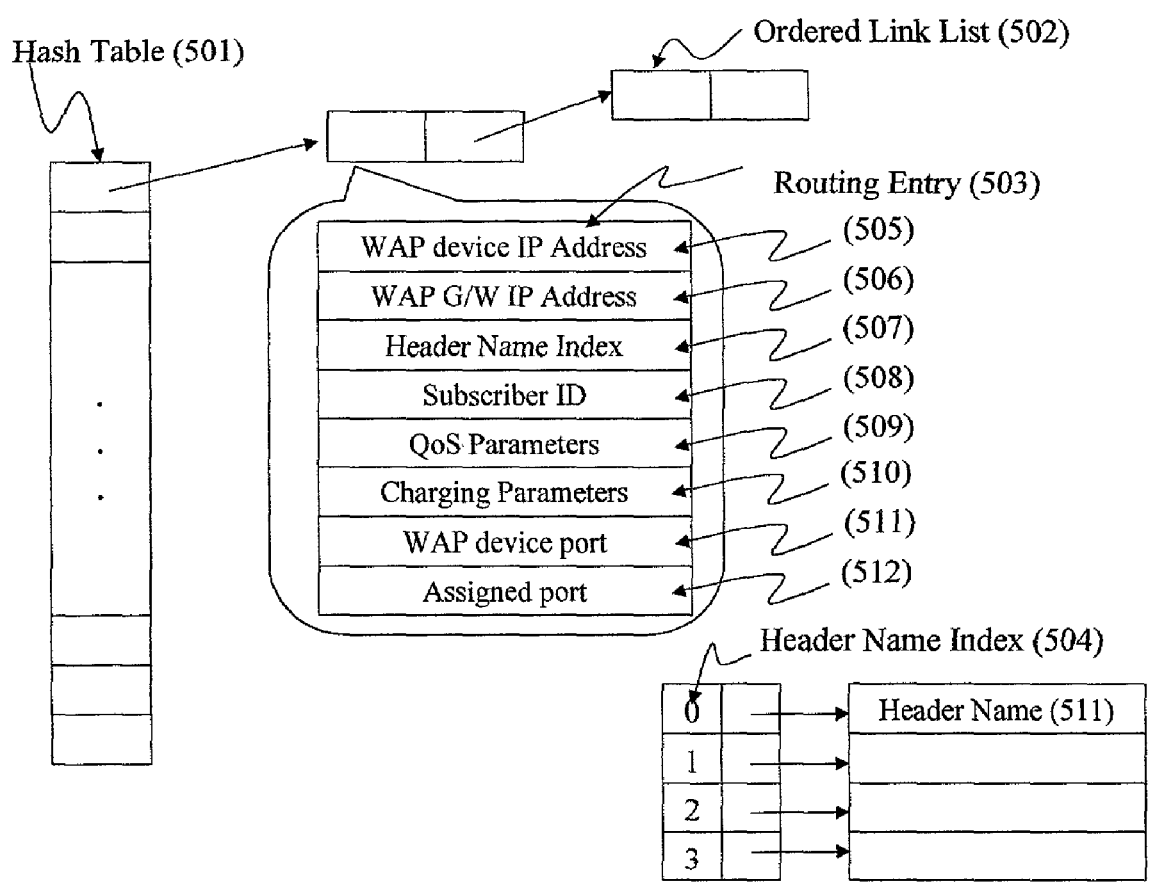
Figure 5 WAP Controller (234) Routing Table (305) Data Structure

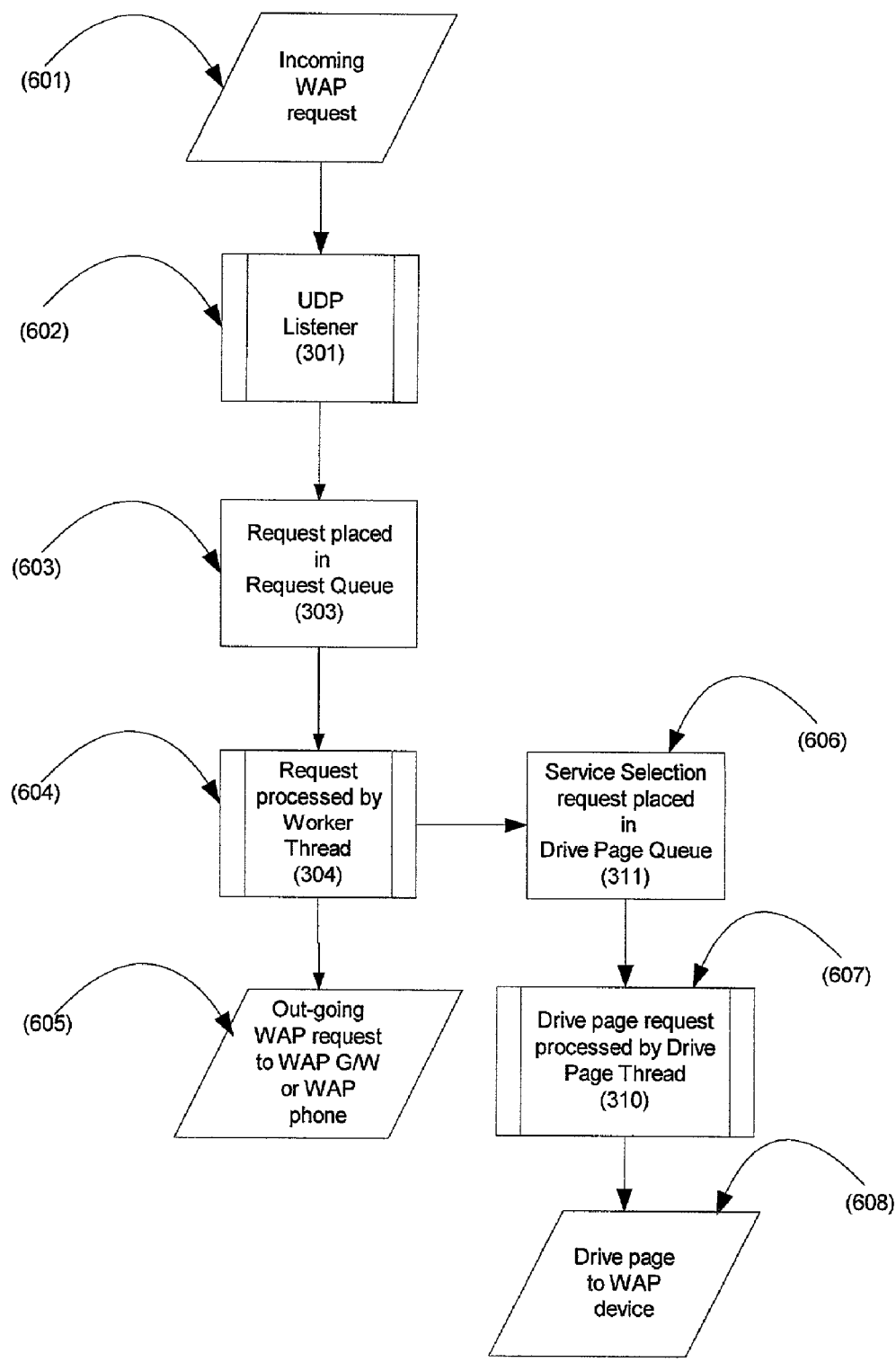
Figure 6. WAP Controller (234) Overall Flow Chart

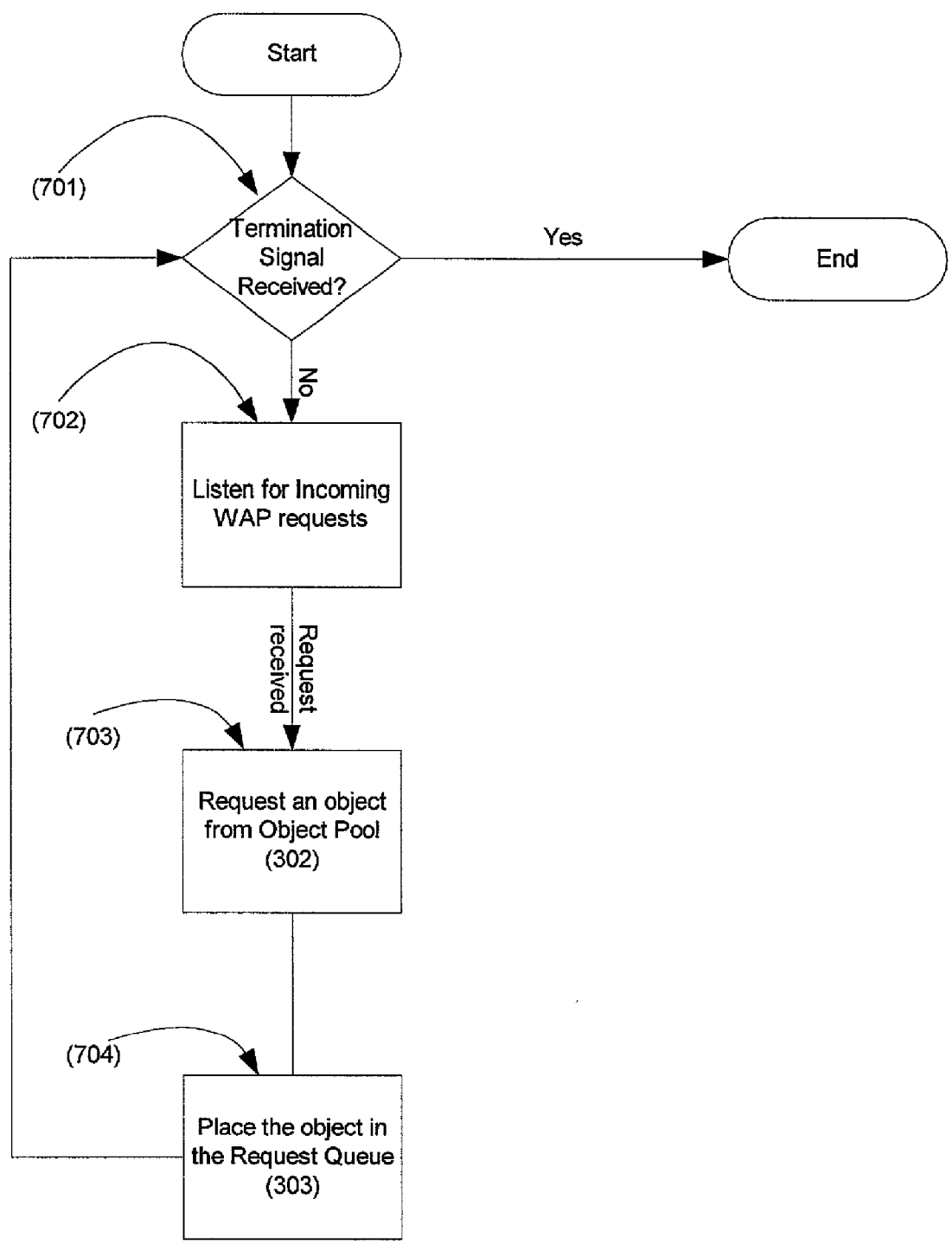
Figure 7. UDP Listener Thread (301) Flow Chart

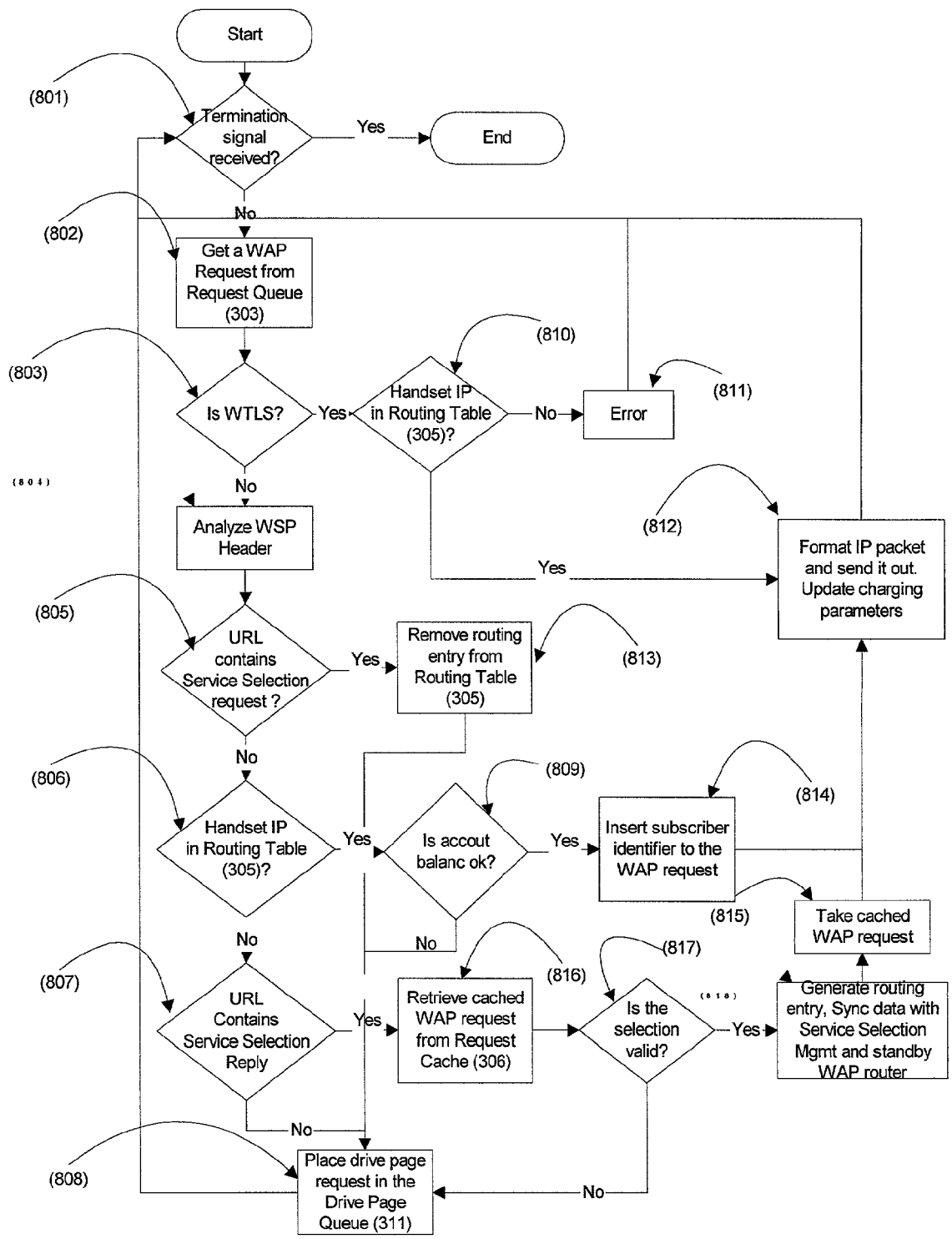
Figure 8 Flow Chart of Worker Thread (304)

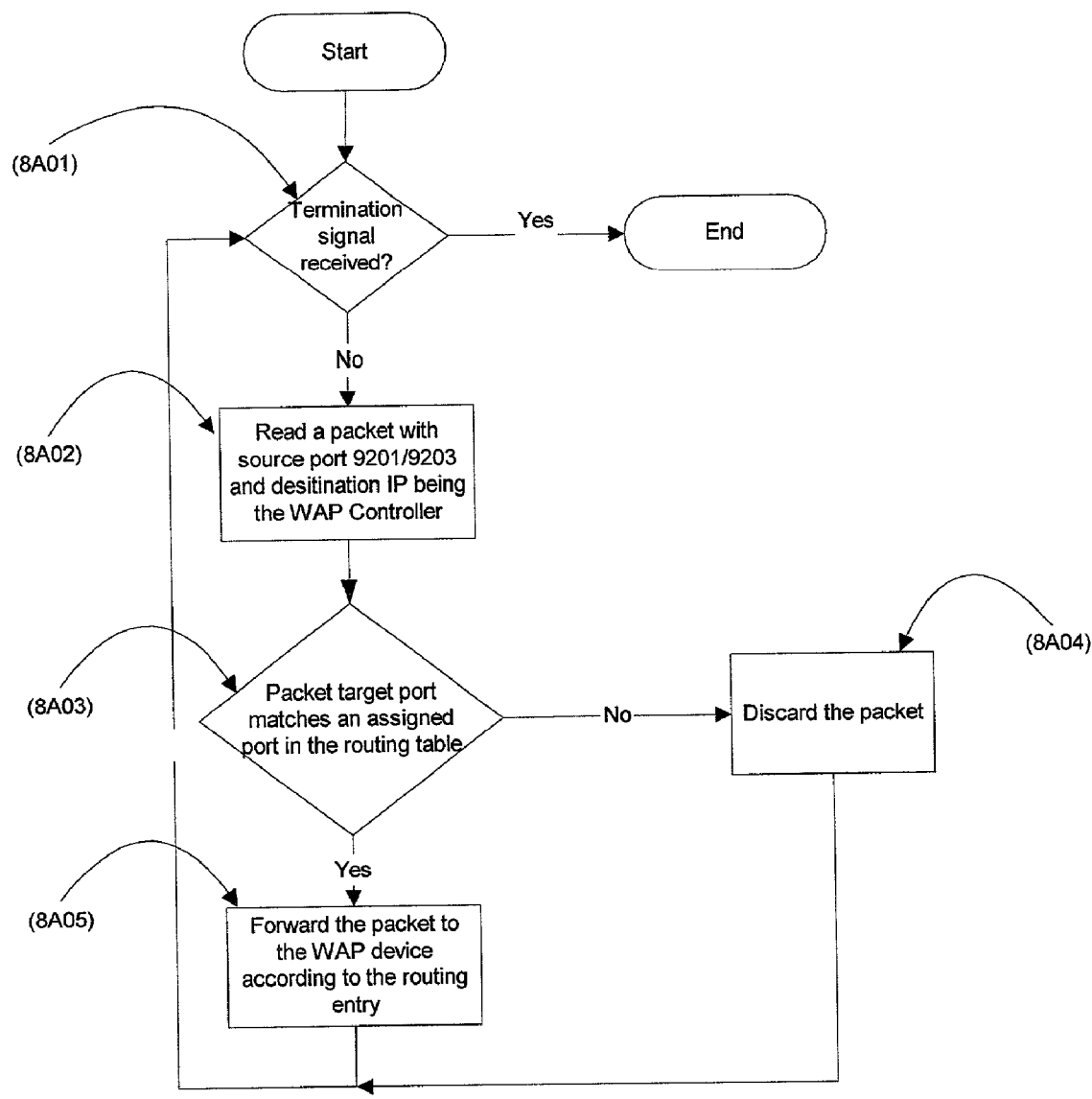
Figure 8A Flow Chart of Packet Sniffer Thread (315)

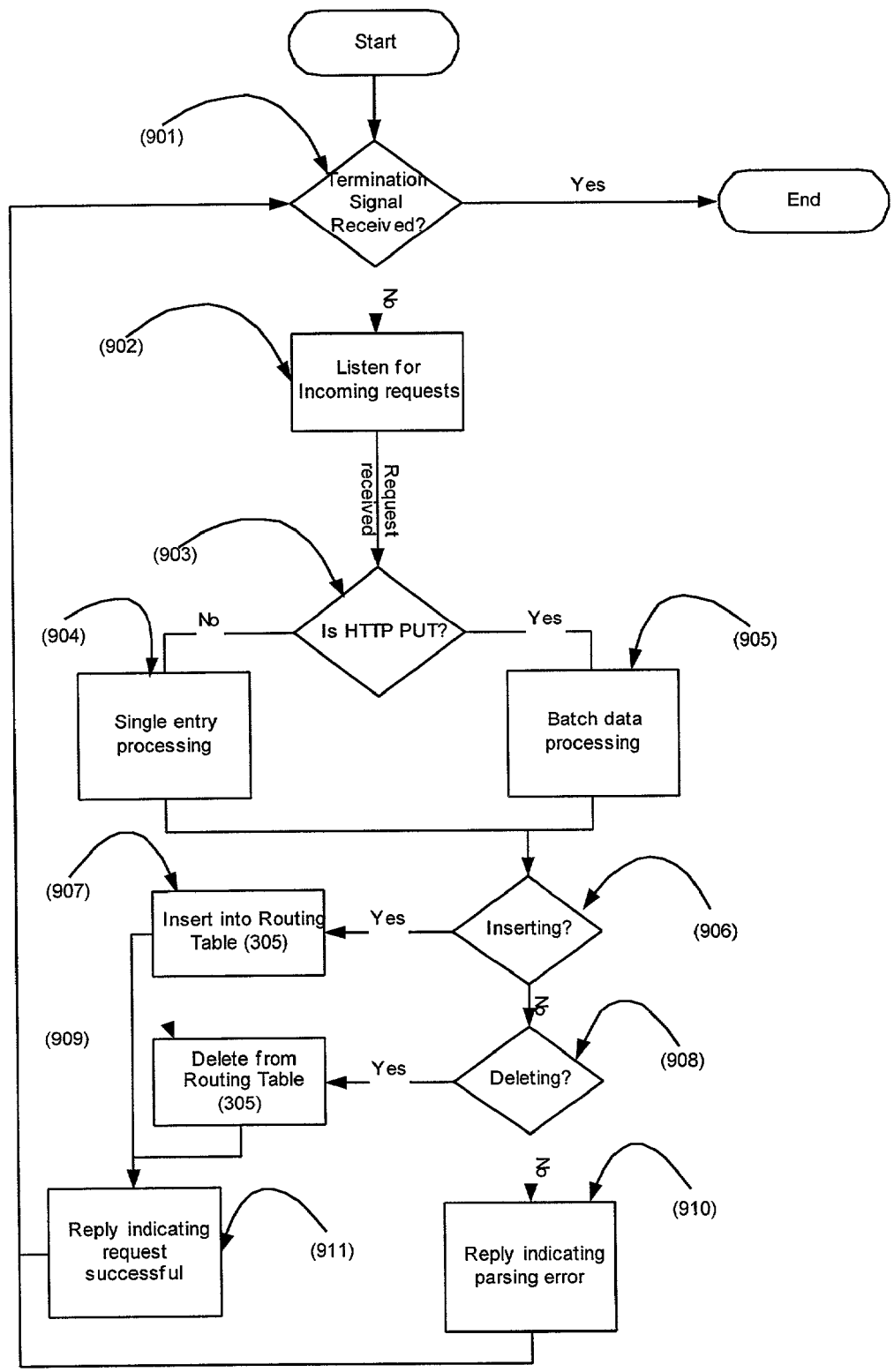
Figure 9 Data Feeder Thread (307) Flow Chart

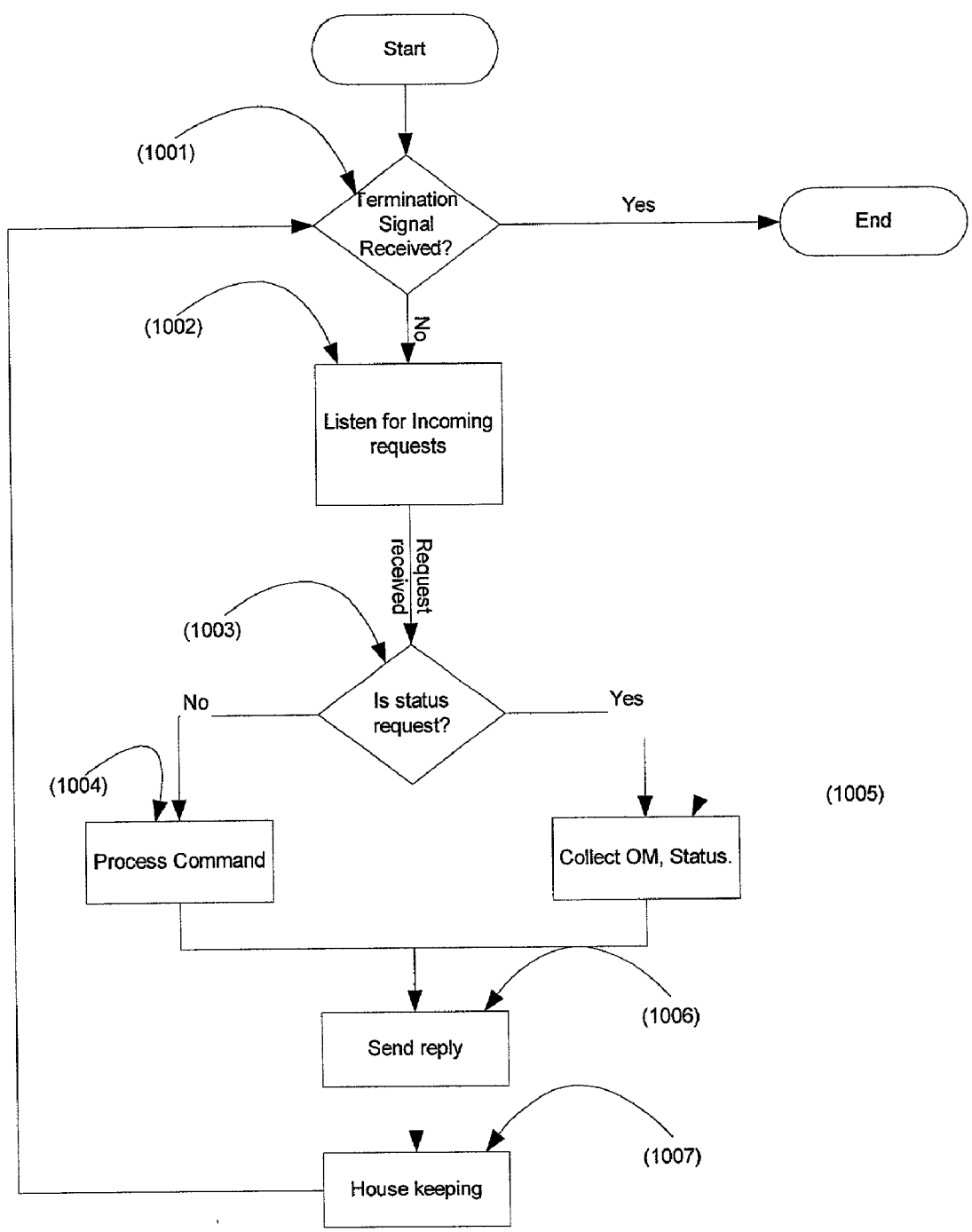
Figure 10. Management Thread (308) Flow Chart

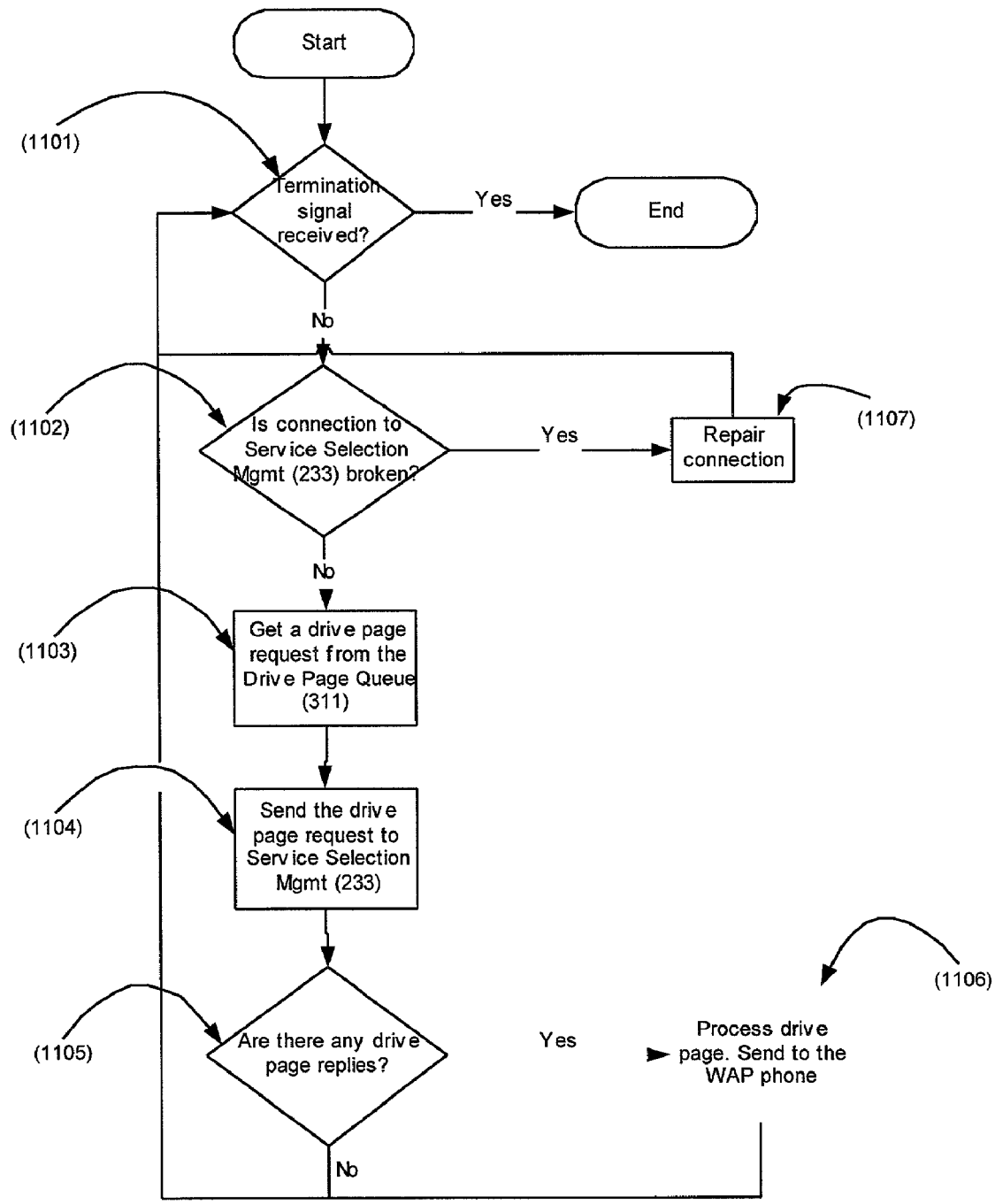
Figure 11 Flow Chart of Drive Page Thread (310)

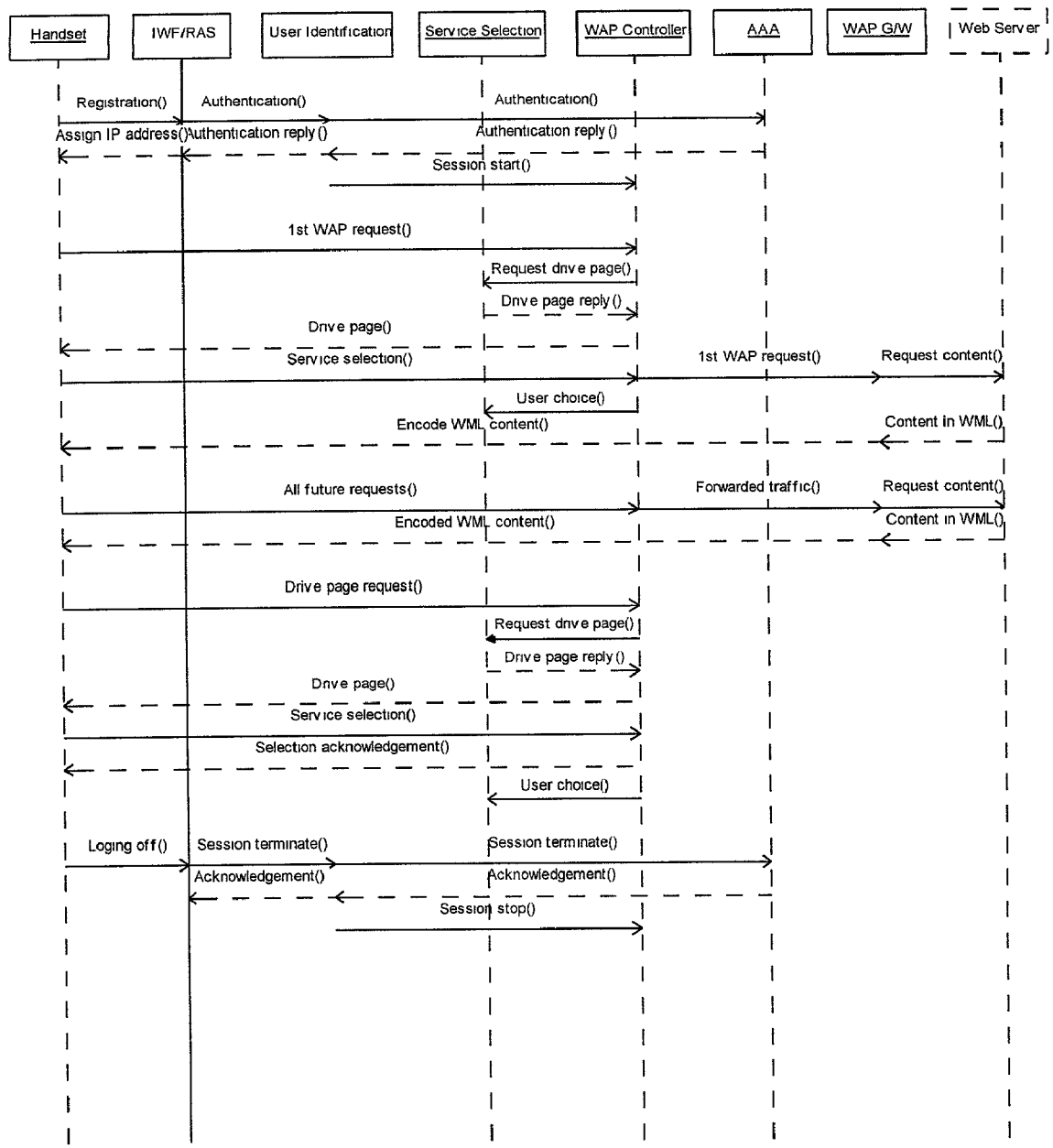
Figure 12 WAP Controller (234), User & Device Identification (232) and Service Selection Management (233) Message Sequence Diagram

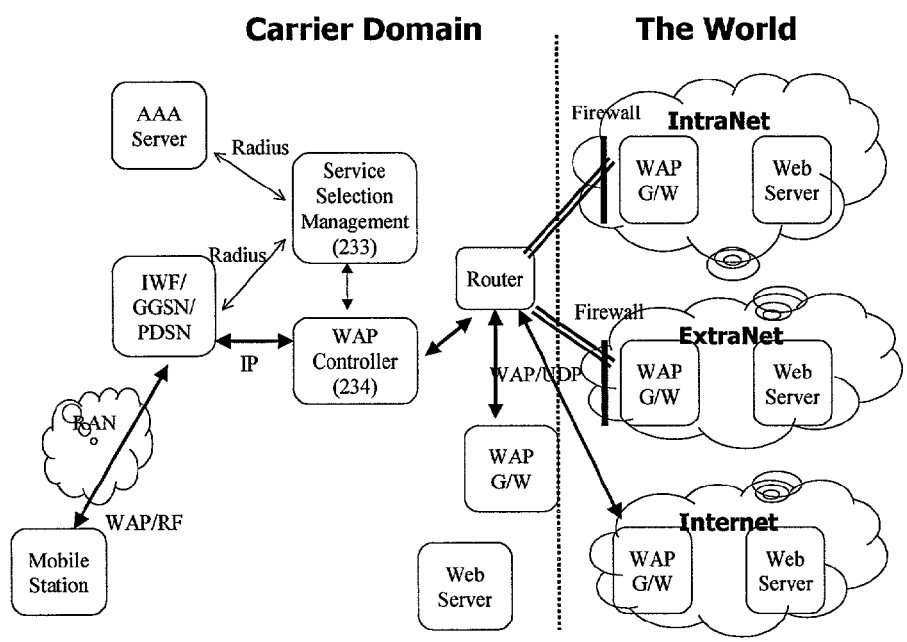
Figure 13 WAP Controller (234) and Service Selection Management (233) Deployment Scenarios

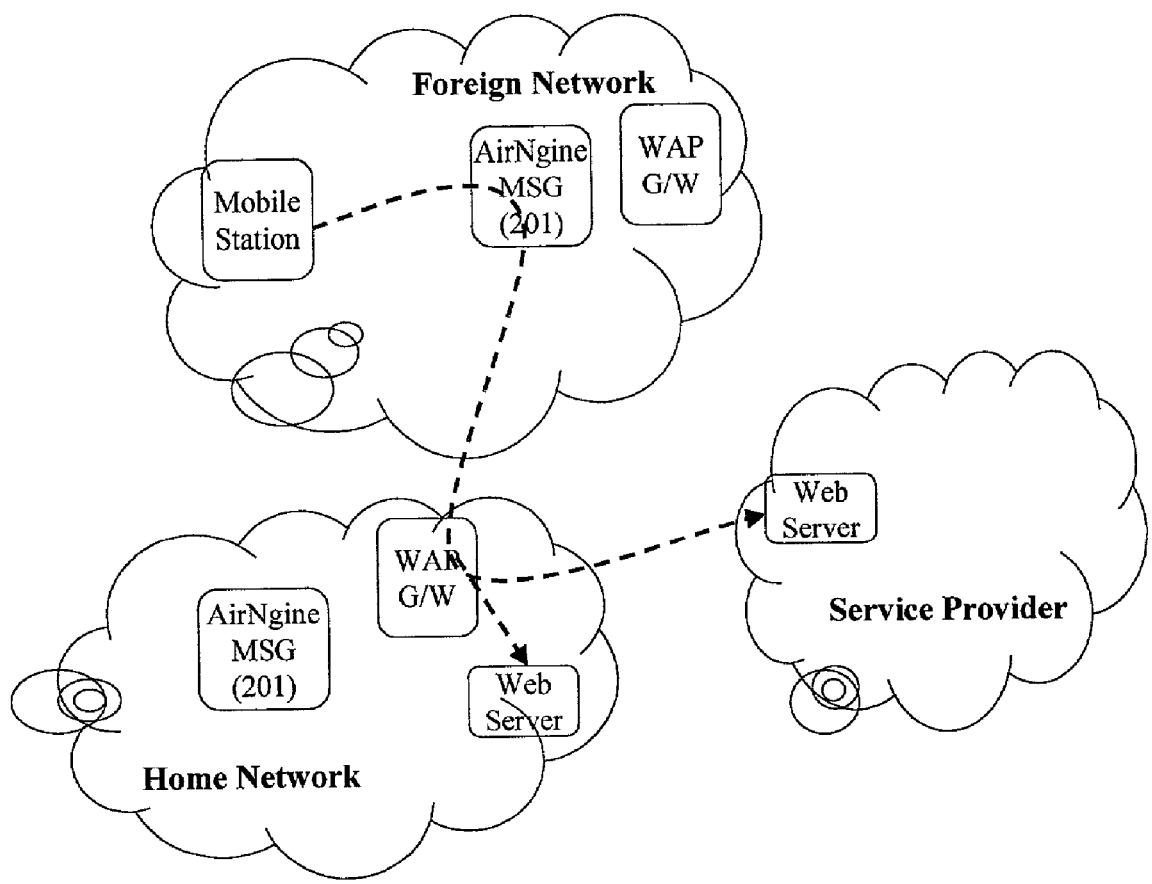
Figure 14 AirNgine MSG (201) in Roaming Scenario

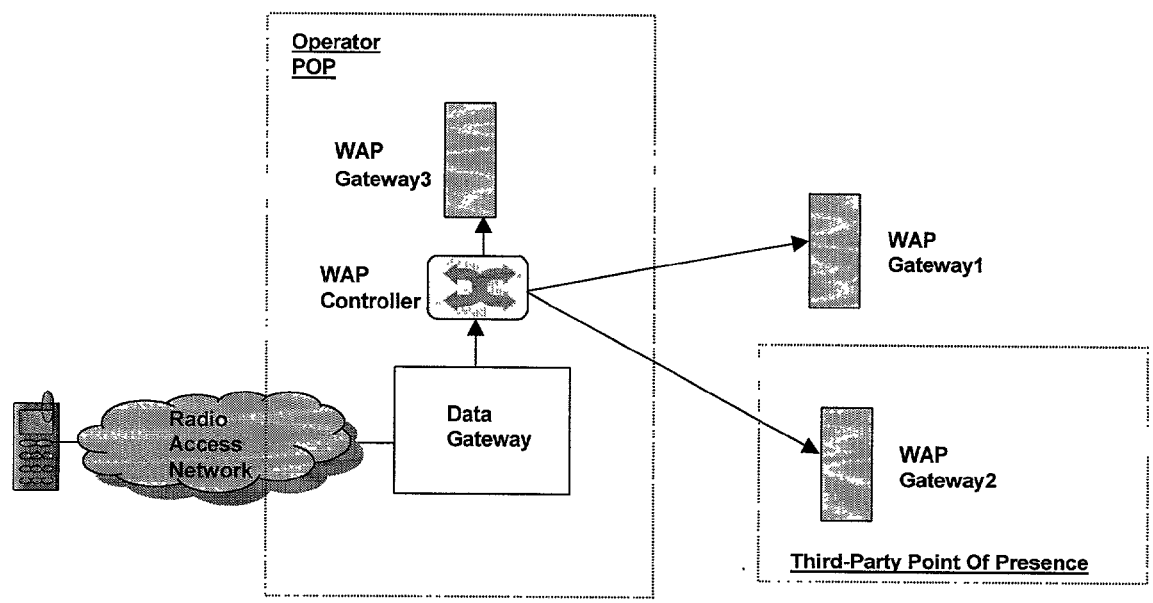
Figure 15 WAP Controller (234) within a Wireless Network External to Data Gateway

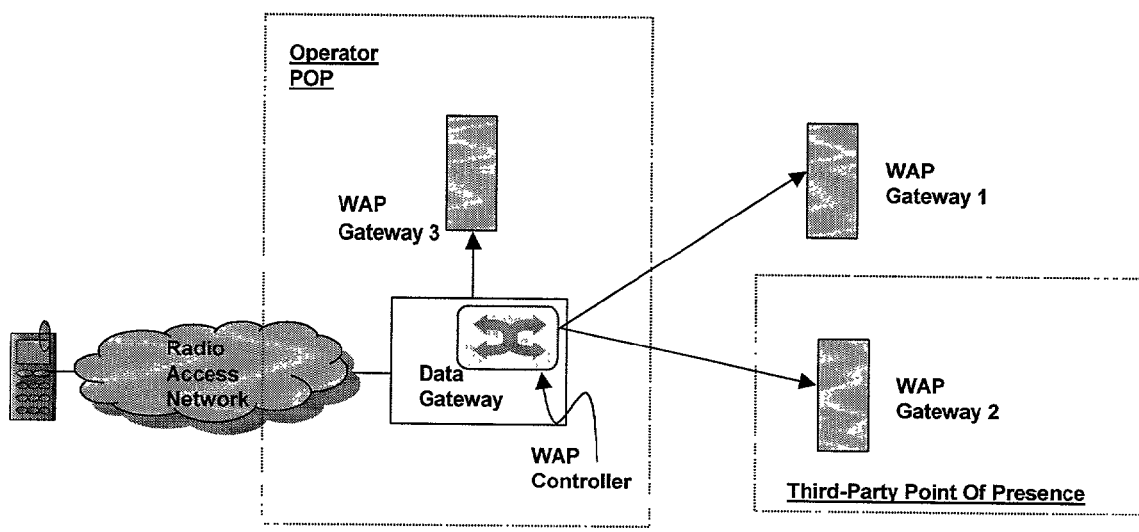
Figure 16 WAP Controller (234) embedded in Data Gateway within a Wireless Data Network

METHOD AND APPARATUS FOR PROVIDING SERVICE SELECTION, REDIRECTION AND MANAGING OF SUBSCRIBER ACCESS TO MULTIPLE WAP (WIRELESS APPLICATION PROTOCOL) GATEWAYS SIMULTANEOUSLY

CROSS REFERENCES

For background information this patent refers to the following publications,

[Ref-1] "Wireless Application Protocol (WAP) Specification", version 1.2.1, June 2000, WAP Forum. http://www.wapforum.com/what/technical.htm

[Ref-2] "WAP Wireless Session Protocol Specification", version 4 May 2000, WAP Forum. pp. 63–70.

[Ref-3] "WAP Wireless Transaction Protocol Specification", version 19 Feb. 2000, WAP Forum, pp. 22–66.

[Ref-4] "WAP Wireless Datagram Protocol Specification", version 19 Feb. 2000, WAP Forum, pp. 23–50.

[Ref-5] "WAP Architecture Specification", version 30 Apr. 1998, WAP Forum.

[Ref-6] "WAP Wireless Transport Layer Security Specification", version 18 Feb. 2000, WAP Forum.

[Ref-7] "User Datagram Protocol", IETF RFC-768, 28 Aug. 1980.

[Ref-8] "Internet Protocol", IETF RFC-791, September 1981.

[Ref-10] "Hypertext Transfer Protocol—HTTP/1.1", IETF RFC-2068, January 1997.

[Ref-11] "Open Service Architecture, Application Programming Interface—Part 1 (Release 1999)", 3GPP TS 29.198 V3.2.0, 3rd Generation Partnership Project; December 2000.

[Ref-12] "WAP Architecture Specification 2.0", WAP Forum, October 2000.

BRIEF SUMMARY—FIELD OF EMBODIMENT

The embodiments disclosed herein relate to the development and use of a smart controller to provide dynamic service selection, policing, redirection and management of WAP (Wireless Application Protocol) traffic, or like wireless data traffic, in a wireless data network. In particular the embodiments relates to:

1. The development of a dynamic integrated subscriber WAP routing table (305) of FIG. 3 that combines subscriber's individual service profile, the subscriber's WAP-gateway selection and the WAP-gateway's service profiles.
2. The use and application of the above "table" along with various subscriber identifiers to enable an efficient method of inspecting WAP traffic in the system of FIG. 3, entitled "WAP Controller", to dynamically alter the subscriber serving WAP gateway without session interruption (see FIG. 13).
3. The use of the above WAP Controller of FIG. 3 to provide simultaneous access to multiple WAP gateways during a single data session (also referred to as Service Selection).
4. The use of the above WAP Controller of FIG. 3 to enable new wireless data service parameters to be developed and dynamically implemented (example Roaming support, pre-paid and pay-per-use data services) and the enforcement of traffic behaviors on WAP traffic depending on different service/subscriber profiles.

BACKGROUND—DESCRIPTION OF PRIOR ART

WAP (Wireless Application Protocol) Architecture

WAP (Wireless Application Protocol) is a standard proposed by the WAP Forum (http://www.wapforum.org) [Ref-1, Ref-5] that allows information to be sent and received by wireless devices. WAP has been deployed in several existing cellular wireless data networks (e.g., GSM, TDMA and CDMA).

WAP capable wireless devices (WAP devices) have several operational constraints compared to traditional Internet access devices such as personal computers. These limitations include a less powerful CPU, less memory, restricted power consumption, smaller display, and different input methods to the device. In addition, WAP devices operate in an environment that generally provides less bandwidth, less connection stability, less predictable availability, and greater latency than their wire-line counterparts. With these considerations, the WAP Forum introduced a new network element called the WAP Gateway that was targeted at addressing one or more of these issues.

In a traditional browser environment the processing and caching takes place in a single location with the display being located adjacent to the data handling. The WAP gateway splits this process acting as a proxy (i.e. hosting default home page, recording cookies, content and protocol conversions, etc.) for the devices as shown in FIG. 1A. In addition, the WAP gateway has been forced to provide several adjacent functions that assist in the end-to-end flow of data as part of the bridging or proxy function that they perform in the wireless network.

Another prior art concept is the unique identification of subscriber in the IP and wireless domains. However, due to privacy concerns, the WAP standard does not allow the device to send in a unique identifier in its requests, where one such identifier may be the phone number of the device, commonly referred as the MSISDN (Mobile Subscriber ISDN number). This inability to transmit an ID poses a serious challenge to the application development on the Web server which does not have a consistent means to identify the WAP device and hence the user. The solution, from application development side, is to require the user to log on by typing a user ID or MSISDN plus a password. Owing to the limited capability of the input method on the device, this is both inconvenient and difficult. Therefore, a need exists for a more convenient and simple way to allow WAP or wireless data requests to be tagged with IDs so that services can be differentiated on a request-by-request basis, a user-by-user basis, or a device-by-device basis, since this function is desirable and is not possible using conventional devices.

WAP gateway vendors have developed solutions to obtain IP address to MSISDN mapping from the NAS (Network Access Server) or AAA (Authentication, Authorization and Accounting) server. The WAP gateway then can identify each WAP request by the IP address and pass the MSISDN either in the URL or the HTTP header to applications running on Web servers. This requires the WAP gateway to collocate with the NAS or AAA in the carrier domain, which limits the configuration possibilities of the system. Enterprises and Wireless Portals who would like to control user experience by owning the WAP gateway will not have access to this critical information in the NAS or AAA, whereby flexibility within the system is lost when using this approach.

Another prior art method involves using the service control in existing WAP implementations. In existing wireless data networks the choice of WAP application is established through:
1. WAP page selection system; or
2. Multiple-profile system.

In the WAP page selection system, the subscriber is presented multiple origin server choices through a single WAP gateway (WAP implementations/protocol associate a WAP device with a single WAP gateway).

The IP address of the WAP gateway is embedded in the WAP device restricting the device from accessing any other end-point directly and forcing one single WAP gateway to provide all services to the WAP device. This severely restricts the flexibility and scope of services that may be provided to the end user. In summary, this type of a system results in two major problems:
1. A security problem known as the WAP security hole; and
2. A service problem where the services that are provided to the subscriber are undifferentiated or inflexible.

WAP Security Hole

In a traditional WAP session a data request is encrypted by the WAP device and transmitted over the WAP device to the WAP gateway using the Wireless Transport Layer Security (WTLS) protocol [Ref-6]. The WAP gateway is then forced to decrypt the message and then re-encrypt it using another protocol (e.g. Secure Socket Layer) before transmitting it to the data content site origin server (FIG. 1B). The WTLS certificate only authenticates the WAP device to the WAP gateway. Therefore, to ensure end-to-end authentication, the WAP gateway would need to reside on the content site. However, the presence of an embedded WAP gateway IP address in the WAP device forces the subscriber to break connection with the network, re-program the IP address in the WAP device for each separate WAP service access. For mission-critical applications that demand high data security, it's desirable to have the WAP gateway co-located with the application. Therefore, a different manner of delivering encrypted WAP traffic is needed to ensure that the WAP security hole problem is solved or at least reduced in severity.

Undifferentiated Service

When subscribers access applications through a single WAP gateway, the network service level they receive is limited by the service tier of the WAP gateway (which is the primary network element). As a result, in centralized WAP gateway deployments, both critical and casual applications have the same bandwidth allocation, the same latency, and the same security parameters associated with them in a single service tier. In order for individual application bundles to be associated with differentiated service tiers a unique WAP gateway needs to be coupled with each bundle. The combination of the applications plus the network service level then creates a "WAP service level".

In a conventional multiple-profile system, the subscriber defines multiple profiles with each profile containing a unique WAP gateway IP address, NAS (Network Access Server) dialup number, user ID and password. Unfortunately, switching to a new application, forces the subscriber to terminate the current session, modify the profile choice, and start a new session. Dynamically changing the WAP gateway provider within the same session is impossible using conventional techniques and systems. The process to create multiple profiles is cumbersome, tedious, and technically challenging. In addition, wireless network operators have no control over a user's selection on WAP gateway providers, and thus cannot guarantee overall service control. Therefore, a need exists for a system that allows a user to change WAP gateways dynamically while in session whereby such a process will also allow tighter and more dynamic control of the quality of service (QoS) on a session-by-session basis.

Wireless Data—Parameter Support

Wireless applications have enhanced usability when they are integrated with wireless-specific information. This includes support for features such as roaming and market preferences such as pre-paid and pay-per-use support.

Roaming

WAP roaming is currently achieved with one of the following methods.

User making long distance calls to the home networks that incurs a huge cost to the user, and is therefore unpopular.

Upgrading the NAS/RAS server in the roaming network to tunnel back to the home network, which is complex and inflexible.

Using a foreign WAP gateway to access the home WAP portals without accessing back to the home network. This methodology loses the user identity at the home WAP system and substantially discounts the user experience.

Using a local dial-up ISP to access the WAP gateway in the home network. Again the user identity will be lost in this approach.

All the existing approaches to roaming are either cost inefficient, unnecessarily complex, and/or substantially reduce the user experience. In addition the prior art does not recognize or provide the ability to provide local services selectively when in a roamed network, largely due to the fact that, in most cases, the user identity is lost.

Pre-Paid and Pay-per-use Support for Wireless Data Services

Mobile Network Operators (MNOs) and Service Providers have developed various pre-paid service packages where services are only provided when there are credits in subscribers' pre-purchased accounts. Pre-paid services have become extensively used by subscribers. However, the pre-paid packages are limited to voice services only and currently there are no pre-paid data services available on conventional networks. This is often due to the fact that the system cannot always identify the user and offer the user unique or selective packages. In addition, the single gateway through which the user accesses the data is only capable of processing certain packages that by definition will limit certain services offered to the subscriber.

Another concept which is yet to be developed in the wireless data network is the pay-per-use data service. In this scenario, subscribers may or may not sign up with the MNO, but can purchase service as they go, on the basis of usage time or number of accesses. Again, this has not been possible in conventional system due to limitations in the configuration and operation of the system.

The current art would restrict or prevent pay-per-use and pre-paid selections to be applied by all applications within a single gateway, thus eliminating the possibility of selective pre-paid application use on a user-by-user or session-by-session basis.

ADVANTAGES OF THE EMBODIMENT

Accordingly, several advantages of the disclosed embodiments are to provide a system and methodology that has one or more of the following aspects:

To provide a system and method for developing an integrated subscriber WAP-gateway routing table. The routing table being used to represent a mapping of the subscriber to the current WAP gateway of choice, the service profile or service level associated with the WAP gateway, and the subscriber's individual security and priority profile/level;

To provide a system and method for each service selection choice to be individually monitored in a dynamic manner so that further requests are appropriately serviced and service is flexible;

To provide a system and method for subscribers to be presented WAP service choices on-demand, each of which represents a different WAP gateway and hence a different service tiers or different quality of service (QoS);

To provide a system and apparatus that allows subscribers to simultaneously access multiple WAP gateways during a single data session;

To provide a system and apparatus that provides an efficient inspection of WAP traffic and enables the WAP-user to dynamically alter his WAP service selection at any time, in or out of session;

To provide a system and apparatus that provides a WAP content provider unique and secure subscriber identification in conjunction with dynamic service selection for the subscriber;

To provide a system and apparatus that enforces different traffic behaviors on WAP traffic depending on the subscriber selection, subscriber profile and Service Agreement;

To provide a system and apparatus that combines Service Selection with a Subscriber and Service Profile System thus enabling new wireless data service parameters to be developed and implemented (example Roaming support and pre-paid/pay-per-use data services) to create more personalized services;

To provide a system and method that affords mobile network operators the capability of offering tiered WAP service with differentiators such as QoS, routing over differentiated transport layers and with value-add information (e.g. inserting subscriber identifier);

To optimize identification of out-going non-WTLS WAP traffic (i.e. from WAP device to WAP gateway) with efficient algorithms and to minimize latency by allowing the returning traffic routed directly to the WAP device.

To generally improve upon WAP, or like wireless, data systems.

Other features and advantages of the present embodiment will become apparent from the following detailed description, in conjunction with the accompanying drawings.

BRIEF DESCRIPTIONS OF THE DRAWINGS

FIG. 1A shows the existing WAP architecture (Prior art).

FIG. 1B shows the security hole problem that exists in the existing WAP architecture (Prior art).

FIG. 2 shows an overall block diagram of the novel AirNgine Mobile Service Gateway (201).

FIG. 3 shows a block diagram of the WAP Controller (234) that is set forth as part of the Service Router (230) in FIG. 2.

FIG. 4 shows the protocol stack of the WAP Controller (234) shown in FIG. 3.

FIG. 5 shows the internal data structure of the Routing Table (305) that is provided within the WAP Controller (234) of FIG. 3.

FIG. 6 shows the overall data flow of the WAP Controller (234) of FIG. 3.

FIG. 7 shows the work flow of the UDP Listener (301) shown in FIG. 3.

FIG. 8 shows the flow chart of a Worker Thread (304) set forth in FIG. 3.

FIG. 8A shows the flow chart of the Packet Sniffer Thread (315) set forth in FIG. 3.

FIG. 9 shows the work flow of the Data Feeder Thread (307) shown in FIG. 3.

FIG. 10 shows the flow diagram of the Management Thread (308) set forth in FIG. 3.

FIG. 11 shows the flow diagram of Drive Page Thread (310) of FIG. 3.

FIG. 12 illustrates the message sequence flow from a WAP device to the WAP Controller (234), Service Selection Management (233), User&Device Identification (232) and WAP gateway.

FIG. 13 shows the deployment scenarios of the AirNgine MSG (201) in a wireless network.

FIG. 14 depicts the traffic flow through AirNgine MSG (201) when in a roaming mode of operation.

FIG. 15 shows WAP Controller (234) of FIG. 3 within a wireless network external to data gateway.

FIG. 16 shows WAP Controller (234) of FIG. 3 embedded in a data gateway within a wireless data network.

PREFERRED EMBODIMENT—DETAILED DESCRIPTION

Generally, the specific embodiments taught herein set forth an improved WAP system and controller. This system is capable of dynamically allowing a WAP user to change WAP gateways in session or out of session. The system also allows for dynamic selection and application of different service profiles. Due to unique packaging and handling of IP addresses and unique application of the timing and location of encoding and decoding, the WAP security hole problem is reduced or eliminated and security of transmitted data is improved. In addition, other benefits are obtained as discussed herein. Specifically, the WAP system and controller can be better understood with reference to FIGS. 1–16 below.

AirNgine Mobile Service Gateway (201)

A high-level block diagram of the AirNgine Mobile Service Gateway (MSG) (201) platform, which is generally the gateway and controller set forth within the system of FIG. 3, is as shown in FIG. 2.

The AirNgine MSG (201) is a service control and policy enforcement element located within in the wireless data network. It is also the integration point between network service entities to which it provides unified access and applications (or end-user services) (e.g., Service Agent (220)). It interacts with:

bearer traffic elements (e.g. IWF, GGSN) (as shown in more detail in FIG. 3), network elements that provide access to wireless information (e.g. MPC), and end-user services/applications resident either in the PLMN space or on the Service Provider premise.

The AirNgine MSG system (201) generally consists of a base Framework (210), feature servers (Service Agent (220)), a Service Router (230), a Subscriber and Service Profile System (SSPS) (240) and an Operation, Administration, Maintenance and Provisioning (OAM&P) (250) system. The AirNgine MSG (201) communicates with network elements through several protocols including, but not limited to, SMPP, SS7/IS41-MAP, SS7/INAP-TCAP and SIP, with applications through an OSA-like API [Ref-11] and natively in WAP with the bearer plane.

The Framework (210) consists of the following primary functions:

Registration Routine (211): Performs user and service registration where a user can register himself or a wireless device and various services associated therewith, and change such selections over time in some embodiments.

Discovery Routine (212): Allows other components to discover new users and services being published and notifies interested components within the system of the new user or services.

Authentication Routine (213): This sub-portion is used to authenticate both users and service providers within the system. Single sign-on (removal of double authentication) will usually depend on the service provider-to-operator Service Level Agreement.

Authorization Routine (214): Provides access to network resources based on static and dynamic service provider profiles.

Usage Accounting Routine (215): Provides transaction-based logging of access to any network resource for use by the billing system (e.g. Call Detail Record (CDR)).

Prioritization Routine (216): Provides differentiated or prioritized use of feature servers (see Service Agent (220)) depending on service provider/subscriber profiles.

The Service Agent (220) in FIG. 2 consists of the following Feature Servers through which it develops wireless smarts for use in both policy enforcement, a unified view to applications, and other functions:

Presence Server (221): Identifies when and whether the subscriber is available for communication flows. This integrates concepts of "buddy lists" and time-of-day (user preference), service priorities and network capabilities (alert message delivery in a multimedia flow) so that users are getting messages when and where they want.

Roaming Server (222): provides out-of-the-box roaming support creating a seamless environment for service presentment and usage by routing mobile device traffic back to the home network whereby the mobile device uses a single fixed IP address.

Connectivity Server (223): Creates the appropriate Virtual Private Network (VPN)/tunnel for an application thus supporting the concept of layer integration. Provide router-provisioning capability for setting up parameters such as tunnels, filtering, Network Address Translation (NAT) as described in the service profile via COPS-PR, Simple Network Management Protocol (SNMP), CLI.

Messaging Server (224): Allows send/receive messages to be processed to/from the mobile device over Short Message Service (SMS). The server interoperates with an SMSC for delivering the SMS messages over SMPP.

Location Server (225): Gathers subscriber location information by interacting with the appropriate network elements (e.g. MPC (Mobile Positioning Center)/PDE (Position Determining Equipment), HLR (Home Location Register)).

The Service Router (230) enables the following network services:

Policy Services (231): Provides service redirection using a coordinated Policy Server with Radius/Diameter, COPS, HTTP/XML interface to the Data Gateway (PDSN/xGSN). Policies are integrated with:
  Wireless smarts delivered through feature server support such as presence, roaming and location;
  Subscriber and service profile systems;
  Enhanced DNS/Redirection Name Server;
  Push Policy Enforcement Parameters to Data Gateway (VPN, QOS, Data Rates/Bandwidth) using the Connectivity server; and
  AAA functions, such as radius/AAA client proxy.

User and Device Identification (232): Derives user and/or device identification by decoding networking level identification. Since the Mobile Service Gateway (MSG) (201) is interested in identifying a subscriber in both wireless and data worlds it needs to create a unique mapping to the MSISDN.

Service Selection Management (233): Provides,
  1. Drive pages for dynamic user service selection (i.e. providing one-click menus or selections to user wireless devices or PDA/device for accessing different web services like prepayment options and data security)—with MAS function support;
  2. Access control (based on policy/user or content provider subscription arrangement/agreement). A Single Sign-On methodology is possible;
  3. Authentication/clearing house (for data on demand access, pre-paid data services, etc.)—with MAS function support;

WAP Controller (234): The Controller is responsible for the flow of WAP traffic to far-end gateways and enables easy development of personalized WAP services. This module is described in much more detail in FIGS. 3–12. It allows an MVNO (Mobile Virtual Network Operator)/enterprise to own the WAP Gateway and provide user (e.g. cookies) and content selection (e.g. top deck). By moving the WAP Gateway into enterprises or financial institutions behind a firewall or like protection (see FIG. 13 where the WAP Gateway is located behind a firewall), the security gap between WTLS and HTTS (the "WAP security hole") is literally plugged and entirely eliminated. This is created with a seamless upgrade path with no impact/changes on existing WAP devices, WAP gateways or applications The Subscriber and Service Profile System (SSPS) (240):

The SSPS (240) stores all the subscriber and service profiles and the rules associated with them. Other components interact with the SSPS (240) via Lightweight Directory Access Protocol (LDAP) and/or Common Object Request Broker Architecture (CORBA) interface.

The AirNgine Platform (201) also has an Operation, Administration, Maintenance and Provisioning OAM&P (250) System that provides full-feature Fault, Configuration, Accounting and Performance management. The objective of the OAM&P (250) is to provide this capability for each of the product components. The management layer (250) will:

Be agnostic of the underlying management protocol, e.g., SNMP or device/application specific protocols.

Take advantage of industry standard framework such as JMX/JDMK.

Have the same look and feel as SSPS (240).

Define Management Information Bases (MIBs) for each managed entity and allow the MIBs to be registered at run-time with the management system.

WAP Controller (234)

The system of FIG. 2 is shown in greater detail in FIG. 3. Specifically, in FIG. 3, the contents of the WAP Controller portion (234) of FIG. 2 is shown in more detail. The present embodiment operates with any wireless data protocol and almost any wireless data network(s) including the existing Second Generation (2G) GSM, TDMA and CDMA Circuit Switched Data (CSD) environment and the forthcoming 2.5G GSM GPRS and CDMA 1XRTT and Third Generation (3G) all-IP wireless data networks as well as other technologies.

The WAP Controller (234) of FIG. 3 requires, in a preferred embodiment, that WAP devices use its IP address as the WAP gateway address, so that all the WAP requests from the WAP device will be sent to the WAP Controller (234). WAP traffic can be classified into two categories, namely pull and push. The pull traffic is initiated by a WAP device requesting a service (e.g., prepaid operations, security changes, etc.) or information from a server, whereas the push traffic is generated by a server delivering information to the WAP device without explicit request. Push notifications identify WAP devices by their MSISDN and generally bypass the WAP controller (234) as shown at a bottom of the FIG. 3. WAP Controller (234) generally addresses the pull traffic. In FIG. 3, the external communications are labeled with protocol names (e.g., WAP/UDP, HTML, etc.). Within the WAP Controller (234), components interact by direct access within the process space with mutual exclusion object (mutex) protection.

FIG. 3 shows the structure of the WAP controller while FIG. 6 shows the overall data flow within the WAP Controller (234). In FIG. 6, an incoming WAP request (601) that is received from a WAP Device is first accepted by the User Datagram Protocol (UDP) Listener (301) (see FIG. 3 for items labeled 3xx in the following paragraphs). The UDP Listener (301) places the request into the Request Queue (303) which is picked up by one of the multi-threaded Worker Threads (304) via steps (602), (603), and (604). The Worker Thread (304) may identify the request as a service selection request and place it in the Drive Page Queue (311) (606), or the Worker Thread (304) may identify the request as a pass-through request and send it out directly to WAP gateways (605). In the event that the request is a service selection request, the request is picked up by one of the Drive Page Threads (310) (607) from the Drive Page Queue (309) which causes a drive page to be sent back to the WAP device (608).

UDP Listener (301)

While FIG. 6 shows the entire process of communication within the Controller (234) that is shown in FIG. 3, FIG. 7 shows the specific flow within the UDP Listener Thread (301) of FIG. 3 when a request is received from the WAP device. The UDP Listener (301) of FIG. 3 performs the task of accepting WAP traffic in its infinite loop manner until a termination signal is received (701). It generally listens (702) at the following UDP and TCP ports for WAP requests from WAP Devices.

9200: WAP connectionless session service
9201: WAP session service
9202: WAP secure connectionless session service
9203: WAP secure session service
9204: WAP vcard
9205: WAP vCal
9206: WAP vCard Secure
9207: WAP vCal Secure When a WAP request arrives from a device, the UDP Listener (301) puts the request in an object (703) together with the WAP device's IP address. To reduce memory allocation/de-allocation, this object is taken from an Object Pool (302) as shown in FIG. 3. The object is then placed in a mutual exclusion object protected (mutex-protected) Request Queue (303) which is monitored by multiple Worker Threads (304). Note that the listening operation within the UDP Listener (301) times out after 2 seconds (or some other reasonable time) so that the termination signal can be checked regularly.

Worker Thread (304)

Once objects are placed into the Request Queue (303) as discussed per FIG. 7, FIG. 8 shows the flow of the Worker Thread (304) when the Thread (304) picks up a WAP request from the Request Queue (303). Generally, a Worker Thread (304) performs the tasks of:

analyzing WSP (Wireless Session Protocol) headers from the object, determining whether a request in an object is a service selection request, a service selection reply or a pass through traffic that is to be sent out to a WAP Gateway, routing flow-through traffic (e.g., traffic to WAP Gateways), enforcing pre-paid/pay-per-use rules, and/or performing IP Quality of Service (QoS) packet marking.

The Worker Thread repeats those tasks for objects within the Request Queue (303) indefinitely until a termination signal is received (801).

More specifically, when a request is obtained from Request Queue (303) (802), a Worker Thread (304) performs the following algorithm as shown in FIG. 8.

1. The Worker Thread (304) first checks whether the request is a Wireless Transport Layer Security (WTLS) request (803). If so, it checks whether the IP address is in the Routing Table (305) (810). If so, it goes to step 5 (812), otherwise it's an error (811).

2. The Worker Thread (304) analyzes the Uniform Resource Locator (URL) in the WAP request (804). If the request contains a special URL (e.g. http://DrivePage/) (805) indicating the request for drive page (813), the Worker Thread removes the routing entry from Routing Table (305) and places the request in the Drive Page Queue (311) (813). The request is then considered served for the Worker Thread (304).

3. If the source IP address of the request is in the Routing Table (305) (806), and if the account balance is in order (i.e. within the purchased time and number of access limits) (809), the Worker Thread (304) inserts a subscriber identifier from the routing table (305) into the WAP request header (e.g. DEVICE_PHONE_NUMBER: MSISDN) (814) and moves on to the step 5 (812). If the account balance is over due, a drive page is delivered (808) to notify the user of the balance problem.

4. If the source IP address is not in the Routing Table (305) in step (806), the Worker Thread (304) checks whether the request contains service selection reply URL (e.g. http://Select/CommunityName/) (807). If not, the request is placed in the Drive Page Queue (311) (808) and the request is also stored in Request Cache (306). Otherwise, the worker thread retrieves the cached WAP request from Request Cache (306) and validates the service selection (816). If the selection is valid (817), the Worker Thread generates a corresponding routing entry (818), informs Service Selection Management of the user's choice, and takes the cached request through the steps (818, 815, and 812). Otherwise, the drive page needs to be displayed to the WAP user again (808) by placing the request in the Drive Page Queue (311).

5. Step (812) creates an IP packet with the WAP gateway IP address as the destination IP and the receiving source port as the destination port. For connectionless WAP traffic (port 9200 and 9202), the system uses the WAP device IP address as the source IP and device port as source port. For connection-oriented WAP traffic (port 9201 and 9203), the system uses the WAP controller IP address as the source IP and a free port on the WAP Controller as the source port. The system then sends out the packet and updates the newly assigned port (applicable in connection-oriented mode) and charging parameters within the applicable routing entry. Related CDRs (Call Detail Records) and OMs (Operational Measurements) are generated.

In summary, the Work Threads (304) are used to determine which requests are to be split off for processing by the Service Selection Management (233) routine and which requests are to be processed for communication to the WAP gateway.

Returning to FIG. 3, and in a preferred form, WAP Controller (234) routes Wireless Transport Layer Security (WTLS) traffic to the destination WAP gateway verbatim. For security reasons, WTLS specifications [see Ref-6, page 62] usually require the micro-browser on the WAP device to verify whether the Common Name (defined as the IP address or host name) of WAP gateway matches the WAP gateway IP address used in the WAP device. Since the WAP device uses the IP address of WAP Controller (234), the WAP gateway WTLS certification preferably uses this IP address as its Common Name for security reasons.

The details of the WAP Controller (234) protocol stack are shown in FIG. 4 [Ref-4]. FIG. 4 shows that a request progressed from a mobile device to a WAP proxy server is layered within one of many different types of protocols.

Routing Table (305)

In FIG. 3, because there is no concept of subnets, the WAP Controller's Routing Table (305) may contain millions of entries, comparing with a maximum of 20,000 entries in a standard router. This is especially likely in the 2.5G and 3G environments where WAP devices can be always-on in the IP networks. The Routing Table (305) in FIG. 3 is thus preferably implemented with a Hash Table (501) as shown in FIG. 5 with an almost-constant look-up hashing algorithm using IP addresses in their network integer format. The number of the hash buckets is preferably chosen to be a prime number greater than the total number of routing entries. This reduces the potential hashing collision and improves look-up efficiency.

FIG. 5 shows the Routing Table's (305) internal data structure. The hash table elements for each table entry in table (501) are organized in a Linked List (502) of multiple entries where appropriate. Each element in the linked list is a Routing Entry (503) along with a linked list pointer field. Each Routing Entry (503) contains one or more of the following pieces of information:

A WAP device IP address (505),

Its chosen WAP gateway (G/W) IP address (506),

A preferred subscriber identifier header name index (507) that can be used to identify the community in which the subscriber belongs, The subscriber identifier (508), A QoS parameter (509), Charging parameters (510), WAP device port number (511), and Assigned port number (512).

The Header Name Index (504) (see also (507)) allows each WAP device to have it's preferred subscriber identifier header name (511). The subscriber identifier (508) varies depending on user privacy and service provider requirements. The ID can be the MSISDN, a scrambled MSISND (such as an MD5 digest of the MSISDN), or a common community identifier. The identifier (508) can also be turned off, i.e. empty in some applications. The QoS Parameters (509) enables the WAP Controller (234) to mark WAP traffic using IPv4 TOS (Type of Service) or DS (Differentiated Service) fields to control the quality of service on a per request basis. This QoS Parameter will also work in the future IPv6 environment. The charging parameters (510) capture both the time based costs and number of access charging models for a given user, mobile device or request. The assigned port numbers are indexed for fast searching by the Packet Sniffer thread (315). These numbers are used together with the WAP device IP and port to forward returning connection-oriented WAP traffic.

The Worker Thread (304) algorithm in FIG. 8 and the Hash Table (501) implementation of the Routing Table (305) are useful for optimizing the efficiency of the WAP Controller (234). In addition, information within the Hash Table entries may be modified in session or per request by the user of the mobile device so that dynamic adjustment of the routing table is possible.

Packet Sniffer (315)

In the connection-oriented mode, both the WAP device and the WAP gateway maintain a connection state. The connection state identifies a valid connection by analyzing the quadruple <client IP, client port, server IP, server port>. Packets coming from hosts other than that identified by the valid connection state are discarded. Because of the state information, the WAP Controller (234) has to act as the proxy for the incoming WAP request as well as the returning traffic. Owing to the fact that the WAP Controller (234) needs to proxy a large number of WAP devices, it is most efficient to assign a distinct port on the WAP Controller (234) machine to represent the WAP device and routing the return traffic accordingly. The Packet Sniffer thread (315) performs this task using the routing table with an index on the assigned port. An assigned port is freed when its corresponding WAP device sends an abort request or no WAP traffic is detected over a time-out period (referring to the Management Thread (308)).

FIG. 8A shows the flow of the Packet Sniffer thread (315). The Packet Sniffer thread (315) repetitively grab packets that are originated from port 9201 or 9203 and targeted at the WAP Controller (234) IP address (8A02). The packet's target port number is used to retrieve the related routing entry which contains the WAP device IP address and port number (8A03). With this information, the Packet Sniffer (315) rewrites the destination IP and port of the packets and forwards them to the WAP device (8A05). If no matching routing entry is found, the packet is discarded.

Drive Page Thread (309)

In FIG. 3, the Drive Page Thread (309) is responsible for:
sending drive page requests to Service Selection Management (223),
returning the drive pages back to the WAP devices, and
load balancing multiple Service Selection Managements (223).

There are usually multiple Drive Page Threads (309) running in the system of FIG. 3. Each thread (309) connects to an instance of the Service Selection Management (223) module and is used to process drive page requests for service selection back to the mobile device. FIG. 11 shows the flow of a Drive Page Thread (309) that is shown in FIG. 3. Drive Page Threads (309) run in a perpetual loop until a termination signal is received (1101). In the loop, the Drive Page Thread (309) first tests whether its connection to the Service Selection Management (233) is broken (1102). If so, it proceeds to re-connect without processing any drive page request (1107). When the connection is fine, the Drive Page Thread (309) picks up a request from the Drive Page Queue (310) (1103) and sends it to the Service Selection Management instance (233) (1104), the Thread (309) then checks whether there is any drive page returned from the Service Selection Management (233). If there is any drive pages returned to the Thread (309) by the Management module (233), the drive pages are processed and sent to the WAP device (1106) for presentation to the mobile device user.

Data Feeder (307)

The WAP Controller (234) receives regular updates of routing entries from the Service Selection Management module (233) and User&Device Identification module (232) as soon as WAP users log on and off the network. A logging on event signals a new routing entry to be inserted into WAP Controller (234) Routing Table (305), whereas a logging off event requires removing the related routing entry from the Routing Table (305). Routing entry updates are handled by the Data Feeder Thread (307). The Data Feeder interface (311) follows the HTTP 1.1 [Ref-10] protocol in a preferred form.

FIG. 9 shows the flow of the Data Feeder Thread (307) of FIG. 3. The Data Feeder Thread runs in a loop until a termination signal is received (901). The Thread (307) first listens for incoming data (902) from the modules (232) and (235). If the incoming data is HTTP PUT, the Thread (307) proceeds to batch data processing (905); otherwise the Thread (307) performs single entry processing (904). In processing, if the data requires insertion (a log on), the routing entry is inserted into the Routing Table (305) (907); if the data require deletion (a log off), the routing entry is deleted from the Routing Table (305) (909). After the operation, a success page is sent indicating processing successful (911). If none of the above applies, a failure page is sent denoting processing failure (910).

Management Thread (308)

The WAP Controller (234) also supports a management interface (Process 308 and API 314). The management API (314) provides WAP Controller (234) internal states and statistics in HTML and XML again in HTTP 1.1 protocol in a preferred form. FIG. 10 shows the flow of the Management Thread (308). In particular, the Management Thread (308) is responsible for one or more of:
monitoring other threads. Launching and killing worker threads (304),
responding to heartbeat, operational measurements (OMs), and status requests,
cleaning up stale requests in the Request Cache (306),
freeing unused assigned ports, and
updating the internal clock.

Like other threads, the Management Thread (308) operates in a loop until a termination signal is received (1001). In FIG. 10, the Thread (308) first listens for an incoming request (1002). When a request arrives, it tests whether the request is a status request (1003). If so, the Management Thread collects operational measurements (OMs), status and states (such as number of requests processed and the number of cached requests) and sends the data in a reply page (1005), else the command is processed within the Thread (308) (1004). If the request is a command (such as "halt"), it sets the termination signal and sends a reply page (1006).

User & Device Identification (232)

When a WAP device logs on the wireless network, the IWF/GGSN/PDSN authenticates the WAP device, authorizes its accesses and also accounts for the log on event. This is done by communicating with the AAA server as shown in FIG. 3. In FIG. 3, the IWF/GGSN/PDSN is configured using User&Device Identification (232) as the AM server. The User & Device Identification (232) takes an AAA request, extracts the required data and forwards the request to the actual AAA server. Interesting parameters in an AAA record include Calling-Station-Id (represents the MSISDN), Framed-IP-Address (represents the IP address) and Acct-Status-Type (Start or Stop) RADIUS attributes in the Accounting-Request packets. The information maps an IP address to a MSISDN which is pushed to Routing Management (235) which in turn generates a routing entry and updates the WAP Controller (234) via the Data Feeder (307) and the Routing Table (305). This log on process normally happens before any bearer traffic is started or allowed for that device over the network. The same procedure occurs when a WAP device logs off the network. However, this time the IWF/GGSN/PDSN signals the termination of the session and the Routing Entry (503) for that WAP device is removed from the Routing Table (305) of the WAP Controller (234).

Routing Management (235)

In FIG. 3, the Routing Management (235) stores routing entries persistently and controls the routing entries for the WAP Controller (234) when WAP devices log on and off the wireless network. When a WAP Controller (234) starts up, it requests the Routing Management (235) to fill the Routing Table (305) over the HTTP interface (311) shown in FIG. 3.

The Routing Management (235) pushes routing entries to the WAP Controller (234) accordingly in the event that WAP devices log on the network. Routing Management (235) uses the following strategies to formulate routing entries within the routing table (305).

Default Routing:
If the WAP device has a preferred WAP gateway and takes that gateway as the default all the time, the preferred WAP gateway is used in the Routing Entry (503). This is most useful with a wireless carrier supporting multiple Mobile Virtual Network Operators (MVNOs), enterprises, or portals. The default gateway can change depending on carrier requirement, e.g. special maintenance schedule or network modifications.

Last Choice Routing:
Routing based on user's previous service selection with a user chosen expiration time.

Roaming Routing:
When a WAP device is roaming in the carrier network and there's a roaming agreement with the WAP device's home network WAP gateway identified as the preferred, the WAP device's home network WAP gateway is chosen.

General Routing:

When there is no apparent routing strategy, the Routing Management module will not push any Routing Entry (503) to the WAP Controller (234). The IP address to MSISDN mapping is stored in the User & Device Identification (232) to be used when the first WAP request comes from the WAP device.

Service Selection Management (233)

When WAP Controller (234) needs to provide a drive page, it makes a request to the Service Selection Management (233) of FIG. 2 along with the WAP device's IP address from the Routing Table (305). The Service Selection Management (233) generates a drive page based on user preferences, user group, service subscription which are retrieved from SSPS (240) in FIG. 2, and wireless intelligence (such as location, roaming, pre-paid account, etc.) which are obtained from the Service Agent (220) in FIG. 2. The OAM&P (250) in AirNgine MSG (201) of FIG. 2 allows comprehensive provisioning from Mobile Network Operations (MNOs), Service Providers and end users. The provisioned data is stored in SSPS (240).

In a preferred form, all the HTTP interfaces in the WAP Controller support the efficient HTTP/1.1 pipelining as outlined in [Ref-10].

FIG. 12 shows an example signal flow sequence and message sequence flow from WAP device to the WAP Controller (234) and WAP gateway from log on and sessions start to session end. FIG. 12 is not discussed in detail since it largely summarizes most of the information already discussed with reference to FIGS. 3–11.

FIG. 13 shows the deployment scenarios of the WAP Controller into a wireless network wherein the WAP Controller can dynamically change a session or user device between a plurality of Gateways. Deployment works with GSM/TDMA/CDMA circuit switched data (CSD), GSM and TDMA GPRS, as well as all future IP core networks. Note that the router connected to the WAP controller (234) can dynamically switch access and service between many different WAP gateways and Web Servers, or communicate with multiple gateways in parallel. With the system of FIG. 13 using the Controller of FIGS. 3–12, a multiple-profile system is possible where a user may create multiple profiles where each profile contains a unique WAP gateway IP address, NAS (Network Access Server) dialup number, user ID and password. However, when switching to a new application, the subscriber need not terminate the current session. The current session can be maintained and the profile changed without significant interruption using the system taught herein. In addition, the wireless network operators now has control over user's selection on WAP gateway providers and thus can guarantee overall service control.

Because the WAP Controller (234) performs a common function in a wireless data network, it can also be embedded in a data gateway within a wireless data network, as shown in FIG. 16 (compared with the WAP Controller (234) deployed external to the data gateway as shown in FIG. 15). This flexibility allows a Controller (234) to enable differentiated service for WAP traffic in several different configurations.

The system set forth in FIG. 3 and operationally discussed per FIGS. 4–12 may perform several functions. These functions are set forth below.

Roaming Support

Unlike conventional WAP gateways, the WAP Controller (234) does not need to be exposed to the Internet with a public IP address. In the situation where a carrier operates multiple networks in different countries or carriers with roaming agreements, the WAP Controllers (234) can be configured with the same private IP addresses (such as, 10.0.0.0) in all the networks. A Mobile Station (MS) always uses the same IP address as the WAP gateway address in both the home and foreign networks. In other words, the IP address of the MS is static. Given the set and static IP addresses in the MS, the WAP Controller (234) can route every WAP requests back to the home network WAP gateway with ease. This way, WAP roaming becomes seamless by provisioning roaming users in the SSPS (240) with quick access to the users' home network WAP gateway(s). Consistent personalized services can be assured by ensuring that all roaming traffic is sent directly back to the home Gateway whereby the tables, ID, and information of the home Gateway is accessed and applied, regardless of roaming location. FIG. 14 shows the traffic flow in the roaming scenario whereby an MS in a foreign network can route, by IP addresses, all necessary information directly to the home network hardware and software. As one advantage to this system, user information is not lost when roaming, and the user experience when in a foreign network will be just as if the user was present in his home network.

Pre-Paid and Pay-per-use Support

The WAP Controller (234) is located at the best position to handle prepaid and pay-per-use data service because it intercepts WAP traffic after subscribers get into the MNO network but before they reach any services (WAP gateway access, QoS and transport end points, etc.). Therefore, the WAP Controller (234) will enforce pre-paid and pay-per-use criteria (i.e. time and number of accesses) when traffic is passing through on a per subscriber or per session basis. Therefore, the system taught herein provides useful elements and advantages when offering pre-paid and pay-per-use data services to mobile device or WAP subscribers.

While the WAP system and methods herein are taught, described, and illustrated with reference to specific implementations, further modifications and improvements will occur to those skilled in the art. For example, the system and methods taught herein can work for other wireless technology standards and methods other than WAP. It is to be understood, therefore, that the claims should not be limited to the particular forms and embodiments illustrated herein and that it is intended that the appended claims cover all modifications that do not depart from the spirit and scope of this invention.

We claim:

1. A wireless system comprising:
   a mobile user device that is programmable so that it can be associated with multiple user profiles; and
   a controller coupled to service sessions, having data traffic, between the mobile user device and one or more gateways and servers that handle wireless requests, wherein controller allows the user to change from a first user profile to a second user profile within a session via selections made on the mobile user device without requiring termination of the session, which results in switching data traffic of the mobile user device from one wireless gateway to another wireless gateway;
   wherein a user profile contains at least a unique WAP gateway IP address, NAS (Network Access Server) dialup number, and user.

2. The system of claim 1 wherein the changing of a user profile results in changing a gateway with which the mobile user device is communicating in order to communicate with multiple gateways in parallel.

3. A wireless system for processing wireless requests, the system comprising:
 a controller coupled to service sessions between the mobile user device and one or more wireless gateways and servers that handle wireless requests; and
 a service selection management program coupled to the controller, wherein the controller provides service selection information to the service selection management program and the service selection management program communicates with the mobile user device to allow service selections to be dynamically changed while a wireless session is being conducted, and wherein subscriber identifiers and other parameters are placed into the wireless request to identify the changing service requirements.

4. The system of claim 3 wherein the wireless device identifiers set user security levels for wireless data transmissions.

5. A wireless system for processing wireless requests, the system comprising:
 a controller coupled to service sessions between the mobile user device and one or more wireless gateways and servers that handle wireless requests; and
 a service selection management program coupled to the controller,
 wherein the controller provides service selection information to the service selection management program to allow the operator to dynamically establish differentiated revenue models with tiered services based on one or more of a geo-position of the mobile user device, data packet quality of service (QoS), transport security settings, network loading or prioritized resource utilization levels.

6. A wireless system for processing wireless requests, the system comprising:
 a controller coupled to service sessions between the mobile user device and one or more servers that handle wireless requests;
 a service selection management program coupled to the controller; and
 a plurality of wireless gateways that handle wireless requests and are connected between the controller and the one or more servers wherein the service selection management program monitors information associated with a wireless session to determine selectively which wireless gateway is to process that wireless session.

7. The system of claim 6 wherein the service selection management program is capable of intelligent service-dependent routing of WAP traffic based on mobile user device roaming, mobile user device location, user identification, or WAP service selection.

8. The system of claim 6 wherein the system inserts a subscriber identifier in all non-WTLS WAP requests.

9. The system of claim 6 wherein a plurality of the wireless gateways are enabled in parallel to each other to process a request from mobile user device.

10. A wireless system using a routing table, the routing table comprising:
 a table of table entries stored in memory within the system;
 each table entry within the table being capable of pointing to one or more routing entries; and
 one or more routing entries coupled to one or more table entries;
 wherein each routing entry contains all of: a device address and port, a gateway address, a subscriber ID, a quality of service parameter, an assigned proxy port and charging parameters ordered linked list; hash table.

11. A wireless system using a routing table, the routing table comprising:
 a table of table entries stored in memory within the system;
 each table entry within the table being capable of pointing to one or more routing entries; and
 one or more routing entries coupled to one or more table entries, wherein each routing entry contains one or more of a device address and port, a gateway address, a subscriber ID, a quality of service parameter, an assigned proxy port and charging parameters;
 wherein the table is a hash table and the routing entries are connected as a serial ordered linked lists when more than one routing entry is associated with a single table entry.

12. A wireless system using a routing table, the routing table comprising:
 a table of table entries stored in memory within the system;
 each table entry within the table being capable of pointing to one or more routing entries; and
 one or more routing entries coupled to one or more table entries, wherein each routine entry contains one or more of a device address and port, a gateway address, a subscriber ID, a quality of service parameter, an assigned proxy port and charging parameters;
 wherein a wireless device user can dynamically change one or more of the entries of their routing entry while in session.

13. A wireless system using a routing table, the routing table comprising:
 a table of table entries stored in memory within the system;
 each table entry within the table being capable of pointing to one or more routing entries; and
 one or more routing entries coupled to one or more table entries, wherein each routing entry contains one or more of a device address and port, a gateway address, a subscriber ID, a quality of service parameter, an assigned proxy port and charging parameters;
 wherein the routing table represents a mapping of the subscriber to a current WAP gateway of choice wherein that WAP gateway may be changed by changing information in the routing table.

14. A wireless system using a routing table, the routing table comprising:
 a table of table entries stored in memory within the system;
 each table entry within the table being capable of pointing to one or more routing entries; and
 one or more routing entries coupled to one or more table entries, wherein each routing entry contains one or more of a device address and port, a gateway address, a subscriber ID, a quality of service parameter, an assigned proxy port and charging parameters;
 wherein the routing table represents the service profile or service level associated with a WAP gateway and a subscriber's individual security and priority profile/ level wherein this information may be dynamically changed by the subscriber.

15. A wireless system having a controller, the controller comprising:
   an input routine for receiving information from a wireless device;
   worker threads for processing requests received through the input routine and either obtaining data from external gateways in response to the requests or providing requests to a service management module to process service selection for the wireless device;
   a routing table for use by the worker threads when processing requests; and drive page threads for providing data back to wireless devices in response to processed requests.

16. The system of claim 15 wherein data within memory and associated with each wireless device may be changed so that some of the wireless devices are associated with a variety of payment schemes.

17. The system of claim 15 wherein data within the system for each wireless device may be changed so that some of the wireless devices access a first gateway while other wireless devices access a second gateway.

18. The system of claim 15 wherein service choices for a wireless device may be made on demand by changing information within the routing table.

19. The system of claim 15 wherein each wireless device is assigned a unique identifier in the routing table and dynamic services may be selected and changed using that unique identifier.

20. A method to support consistent parameters and service settings while roaming within a wireless system, the method comprising:
   fixing a static IP address within a mobile device;
   receiving, in a foreign network, a request from the mobile device where the request is associated with the static IP address;
   forwarding the request from the foreign network to a wireless gateway within the home network using the static IP address; and
   processing, within the home network, the request using parameters and service settings stored within the home network.

\* \* \* \* \*